United States Patent
You et al.

(10) Patent No.: US 10,200,938 B2
(45) Date of Patent: Feb. 5, 2019

(54) METHOD FOR PERFORMING CELL SEARCH PROCEDURE AND USER EQUIPMENT FOR PERFORMING SEARCH PROCEDURE ON BASIS OF SEARCH SIGNAL IN WIRELESS COMMUNICATION SYSTEM

(71) Applicant: LG ELECTRONICS INC., Seoul (KR)

(72) Inventors: Hyangsun You, Seoul (KR); Yunjung Yi, Seoul (KR); Joonkui Ahn, Seoul (KR); Jonghyun Park, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 33 days.

(21) Appl. No.: 14/915,522

(22) PCT Filed: Jan. 12, 2015

(86) PCT No.: PCT/KR2015/000291
§ 371 (c)(1),
(2) Date: Feb. 29, 2016

(87) PCT Pub. No.: WO2015/108308
PCT Pub. Date: Jul. 23, 2015

(65) Prior Publication Data
US 2016/0234762 A1    Aug. 11, 2016

Related U.S. Application Data

(60) Provisional application No. 61/927,972, filed on Jan. 15, 2014, provisional application No. 61/932,811, (Continued)

(51) Int. Cl.
*H04W 48/16* (2009.01)
*H04J 11/00* (2006.01)
(Continued)

(52) U.S. Cl.
CPC ......... *H04W 48/16* (2013.01); *H04J 11/0056* (2013.01); *H04J 11/0073* (2013.01);
(Continued)

(58) Field of Classification Search
CPC ............... H04J 11/0056; H04J 11/0073; H04J 11/0093; H04J 2211/001; H04L 5/001;
(Continued)

(56) References Cited

U.S. PATENT DOCUMENTS 9,398,438 B2 *   7/2016  Sartori ................ H04W 8/005
2008/0095108 A1   4/2008  Malladi et al.
(Continued)

FOREIGN PATENT DOCUMENTS

CN    102377514    3/2012
CN    102404689    4/2012
(Continued)

OTHER PUBLICATIONS

"How LTE Stuff Works? System Information Block Type 1", Nov. 7, 2011.*
(Continued)

*Primary Examiner* — Asad M Nawaz
*Assistant Examiner* — Zhaohui Yang
(74) *Attorney, Agent, or Firm* — Lee Hong Degerman Kang Waimey

(57) ABSTRACT

A disclosure of the present specification provides a method for performing a cell search procedure or a cell discovery procedure in which a discovery signal is transmitted to a resource element determined in consideration of interference between adjacent cells. The method comprises the steps of: receiving a discovery signal generated by a particular small cell; and searching for the particular small cell on the basis of the discovery signal, wherein the position of the (Continued)

resource element to which the discovery signal is transmitted may be changed according to time.

10 Claims, 22 Drawing Sheets

Related U.S. Application Data filed on Jan. 29, 2014, provisional application No. 61/974,429, filed on Apr. 2, 2014, provisional application No. 62/003,556, filed on May 28, 2014.

(51) Int. Cl.
*H04L 5/00* (2006.01)
*H04W 72/04* (2009.01)

(52) U.S. Cl.
CPC .......... *H04J 11/0093* (2013.01); *H04L 5/001* (2013.01); *H04L 5/005* (2013.01); *H04L 5/0032* (2013.01); *H04W 72/0446* (2013.01); *H04J 2211/001* (2013.01)

(58) Field of Classification Search
CPC ...... H04L 5/0032; H04L 5/005; H04W 48/16; H04W 72/0446
See application file for complete search history.

(56) References Cited

U.S. PATENT DOCUMENTS

| | | | |
|---|---|---|---|
| 2013/0077507 A1 | 3/2013 | Yu et al. | |
| 2013/0182799 A1 | 7/2013 | Geirhofer et al. | |
| 2013/0310100 A1 | 11/2013 | Lee et al. | |
| 2014/0171073 A1* | 6/2014 | Kim | H04W 24/10 455/434 |
| 2015/0049649 A1* | 2/2015 | Zhu | H04W 24/08 370/277 |
| 2015/0181508 A1* | 6/2015 | Uchino | H04W 48/16 455/434 |

FOREIGN PATENT DOCUMENTS

| | | |
|---|---|---|
| CN | 102461292 | 5/2012 |
| CN | 102624466 | 8/2012 |
| WO | 13/133682 | 9/2013 |
| WO | 2013135944 | 9/2013 |

OTHER PUBLICATIONS

NEC, "Small Cell on/off Mechanism and Discovery Signal," 3GPP TSG RAN WG1 #75, R1-135262, Nov. 2013, 6 pages.
LG Electronics, "Further Discussions on Small Cell on/off," 3GPP TSG RAN WG1 #75, R1-135473, Nov. 2013, 6 pages.
Intel Corporation, "Evaluation on Small Cell Discovery Signal," 3GPP TSG RAN WG1 #75, R1-135109, Nov. 2013, 11 pages.
NTT Docomo, "Details of Small Cell on/off with Small Cell Discovery," 3GPP TSG RAN WG1 #75, R1-135514, Nov. 2013, 7 pages.
PCT International Application No. PCT/KR2015/000291, Written Opinion of the International Searching Authority dated Mar. 26, 2015, 1 page.
Japan Patent Office Application No. 2016-555438, Office Action dated Jun. 2, 2017, 3 pages.
Harada, et al., "A Study on Discovery Signal for Efficient Macro-assisted Small Cell Discovery Mechanism in LTE SCE", RCS2013-215, Dec. 2013, 7 pages.
European Patent Office Application Serial No. 15737135.2, Partial Search Report dated Aug. 2, 2017, 14 pages.
Korean Intellectual Property Office Application No. 10-2016-7004685, Office Action dated Aug. 21, 2017, 4 pages.
State Intellectual Property Office of the People's Republic of China Application Serial No. 201580004341.9, Office Action dated Sep. 26, 2017, 7 pages.
European Patent Office Application Serial No. 15737135.2, Search Report dated Nov. 8, 2017, 15 pages.
3rd Generation Partnership Project (3GPP), "Technical Specification Group Radio Access Network; Small cell enhancements for E-UTRA and E-UTRAN—Physical layer aspects (Release 12)," 3GPP TR 36.872 V1.0.0, Aug. 2013, 79 pages.
NTT Docomo, "Small Cell Discovery for Efficient Small Cell on/off Operation", 3GPP TSG RAN WG1 Meeting #74, R1-133457, Aug. 2013, 8 pages.
Panasonic, "Discussion on small cell on/off transition time reduction procedure", 3GPP TSG RAN WG1 Meeting #75, R1-135397, Nov. 2013, 4 pages.
ZTE, "Further considerations on enhanced transition procedures of small cell on/off scheme", 3GPP TSG RAN WG1 Meeting #75, R1-135350, Nov. 2013, 8 pages.

\* cited by examiner

FIG. 7
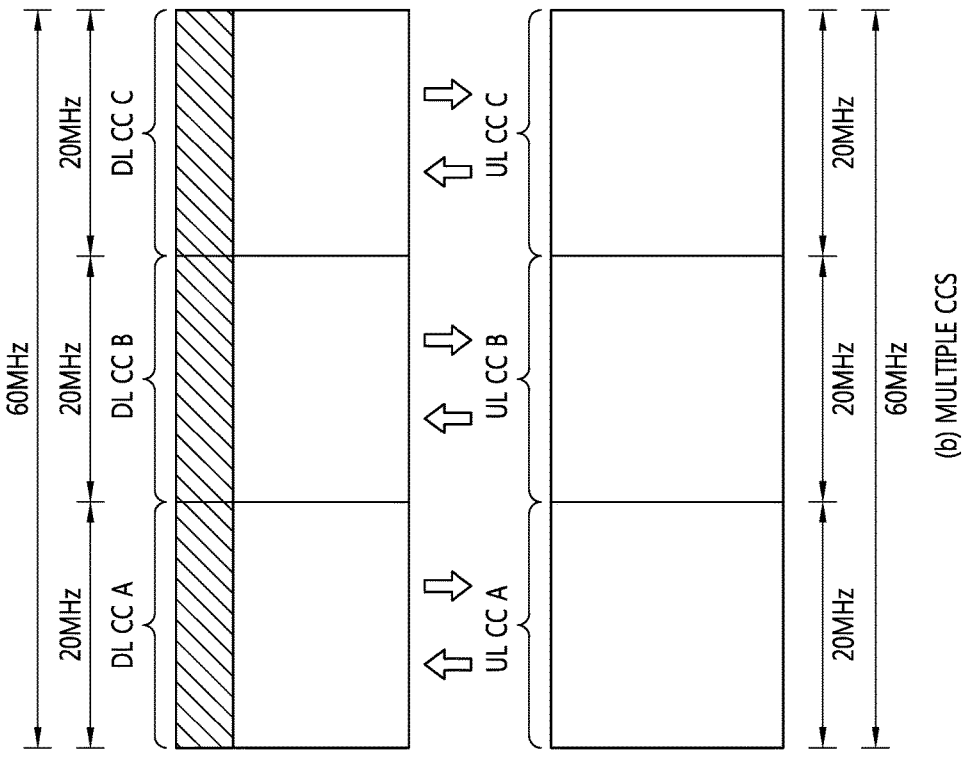
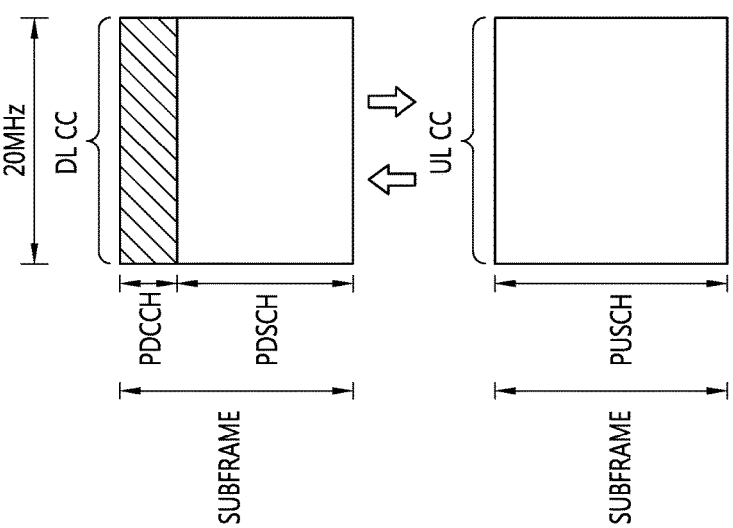

Small cell cluster

Small cell cluster

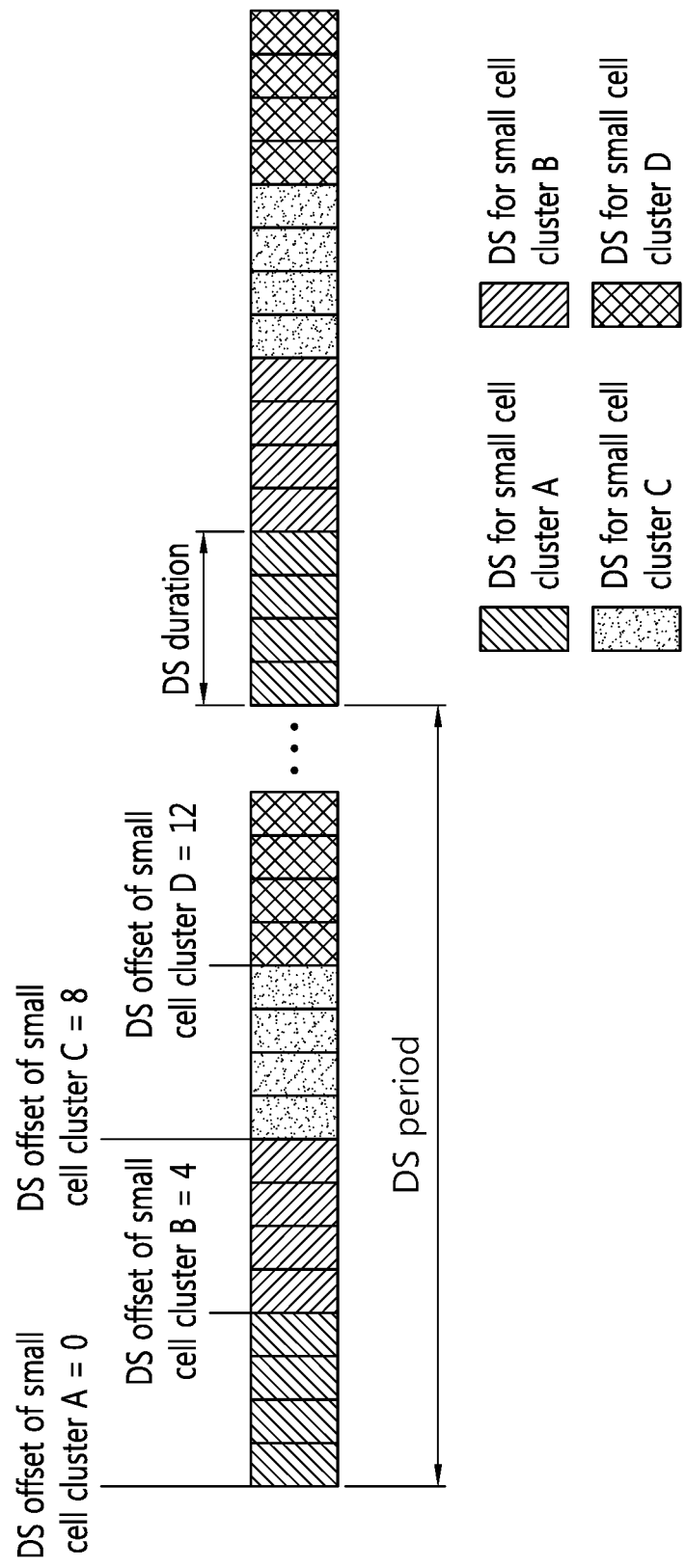

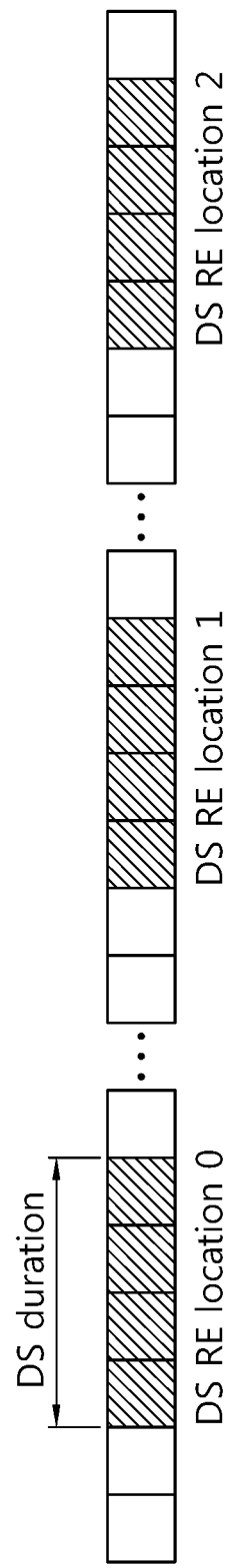

METHOD FOR PERFORMING CELL SEARCH PROCEDURE AND USER EQUIPMENT FOR PERFORMING SEARCH PROCEDURE ON BASIS OF SEARCH SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2015/000291, filed on Jan. 12, 2015, which claims the benefit of U.S. Provisional Application No. 61/927,972, filed on Jan. 15, 2014, 61/932,811, filed on Jan. 29, 2014, 61/974,429, filed on Apr. 2, 2014 and 62/003,556, filed on May 28, 2014, the contents of which are all hereby incorporated by reference herein in their entirety.

BACKGROUND OF THE INVENTION

Field of the Invention

The present invention relates to wireless communication.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", 3GPP LTE/LTE-A may divide the physical channel into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

Meanwhile, in recent years, an environment for establishing a plurality of small-scaled cells (or small cells) or an environment simultaneously using a plurality of small cells or a macro cell may be considered or established.

In this case, the small cell may be used a primary cell (Pcell) of specific UE. A corresponding small cell may be used as only a secondary cell (S cell).

Further, recently, it is considered that the UE generates and transmits a new search signal in addition to an existing PSS (primary synchronization signal)/SSS (secondary synchronization signal) PSS (primary synchronization signal)/SSS (secondary synchronization signal) to efficiently find small cells which are densely located.

However, since a plurality of small cells are located in the same channel to be close to each other in the above small cell environment, interference between small cells may have a problem larger than that of interference of the macro cell.

SUMMARY OF THE INVENTION

The present invention has been made in an effort to solve the above-discussed problem.

In order to accomplish the above object, there is provided a method for receiving a signal which is transmitted on a plurality of subframes and in long periodicity from a plurality of small-scaled cells grouped in unit of a cluster. The method may comprise: receiving the signal on a first subframe from any small-scaled cell among the plurality of the small-scaled cells; and receiving the signal on a second subframe from the any small-scaled cell. A location of a resource element in which the signal is received may be time-varied according to a predetermined hopping pattern such that a location of a resource element in which the signal on the first subframe is received is different from a location of a resource element in which the signal on the second subframe is received.

The signal may be received from the any small-scaled cell in an off state. Here, if the any small-scaled cell is in the off state, any signals except for the signal may not be received.

The location of the resource element in which the signal is received may be time-varied based on a predetermined criteria.

Here, the predetermined criteria may include a subframe, a radio frame and an event with respect to the signal.

The location of the resource element in which the signal is received may be varied based on a time index, which is determined according to a lapse of time and the predetermined criteria.

The predetermined hopping pattern may be determined to be differentiated based on a small-scaled cell or a cluster.

The predetermined hopping pattern may be configured by a macro cell.

The predetermined hopping pattern may be determined based on at least one of a cell identifier of the any small-scaled cell, a cluster identifier of a cluster including the any small-scaled cell and a time index.

The signal may have the same pattern as or a similar pattern to a pattern of cell-specific reference signal (CRS), a channel-state information reference signal (CSI-RS) and a primary synchronization signal (PSS).

If the signal has the same pattern as or the similar pattern to a pattern of the CSI-RS, the signal is transmitted in a resource element corresponding the CSI-RS based on a CSI-RS configuration. Here, the CSI-RS configuration is time varied.

If the signal has the same pattern as or the similar pattern to a pattern of the CRS, the signal is transmitted in a resource element which is shifted based on a predetermined pattern from a resource element for the CRS. Here, the predetermined pattern is time varied.

If the signal has the same pattern as or the similar pattern to a pattern of the PRS, the signal is transmitted in a resource element which is shifted based on a predetermined pattern from a resource element for the PRS. Here, the predetermined pattern is time varied.

In order to accomplish the above object, there is provided a user equipment. The user equipment for receiving a signal which is transmitted on a plurality of subframes and in long periodicity from a plurality of small-scaled cells grouped in unit of a cluster. The user equipment may comprise: a radio frequency (RF) unit configured to receive the signal on a first subframe from any small-scaled cell among the plurality of the small-scaled cells; and a processor configured to control the RF unit thereby receiving the signal on a second subframe from the any small-scaled cell. A location of a resource element in which the signal is received may be time-varied according to a predetermined hopping pattern such that a location of a resource element in which the signal on the first subframe is received is different from a location of a resource element in which the signal on the second subframe is received.

According to a disclosure of the present invention, the above problme of the related art is solved. In more detail, according to the discolusure of the pressent specification, a cell search procedure or a cell discovery procedure can be efficently performed since a discovery signal is transmitted on resource elements determined in consieration of an inter-cell interference.

BRIEF DESCRIPTION OF THE DRAWINGS

FIG. 7 illustrates an example of comparing a single carrier system and a carrier aggregation system.

FIG. 16 is an exmplary diagram illustrating an interference avoiding scheme according to a first aspect of a third disclosure of the present invention.

FIG. 18 is an examplary diagram illustrating a resouce element location of a discovery signal changed by bundles of the discovery signal.

DESCRIPTION OF EXEMPLARY EMBODIMENTS

Figure 1:
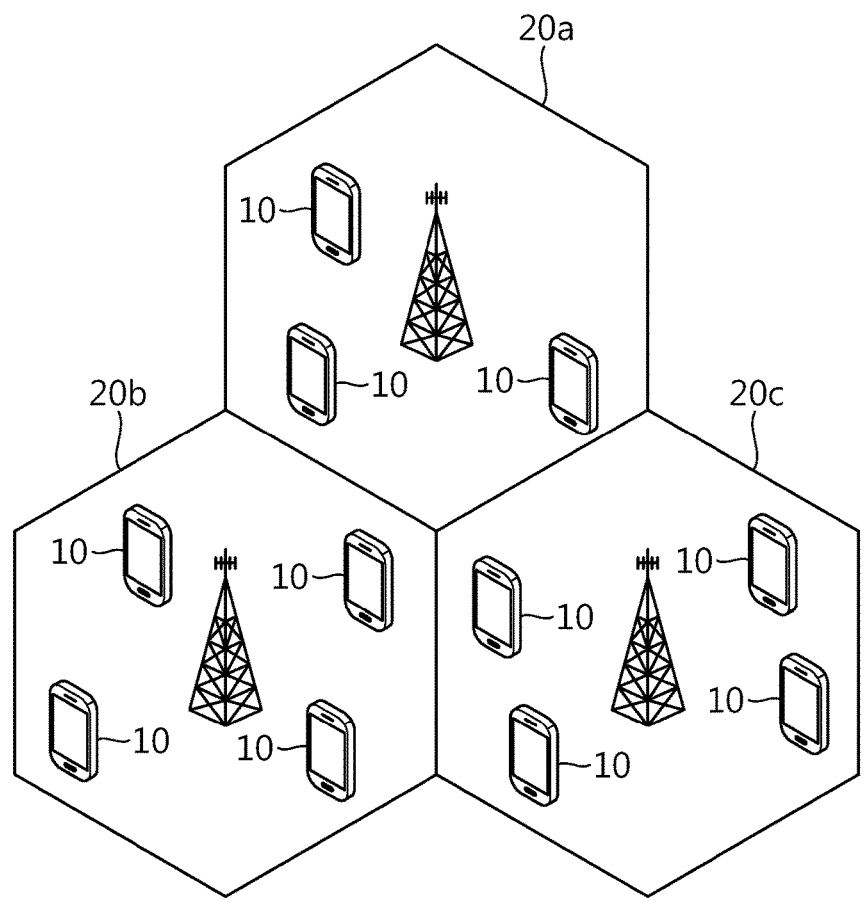
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20*a*, 20*b*, and 20*c*. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
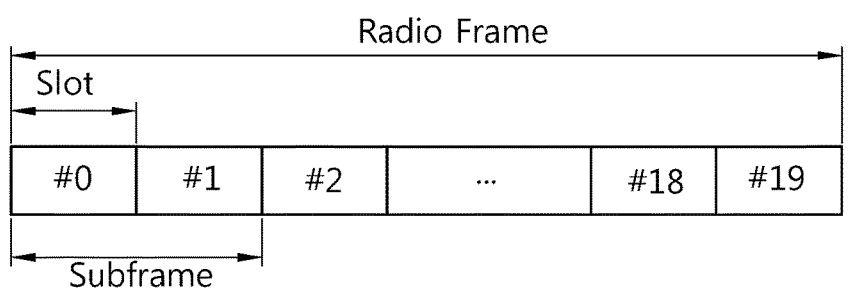
FIG. 2 illustrates a structure of a radio frame according to an FDD in a 3GPP LTE.

FIG. 2 shows a downlink radio frame structure according to FDD of 3rd generation partnership project (3GPP) long term evolution (LTE). [59] The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
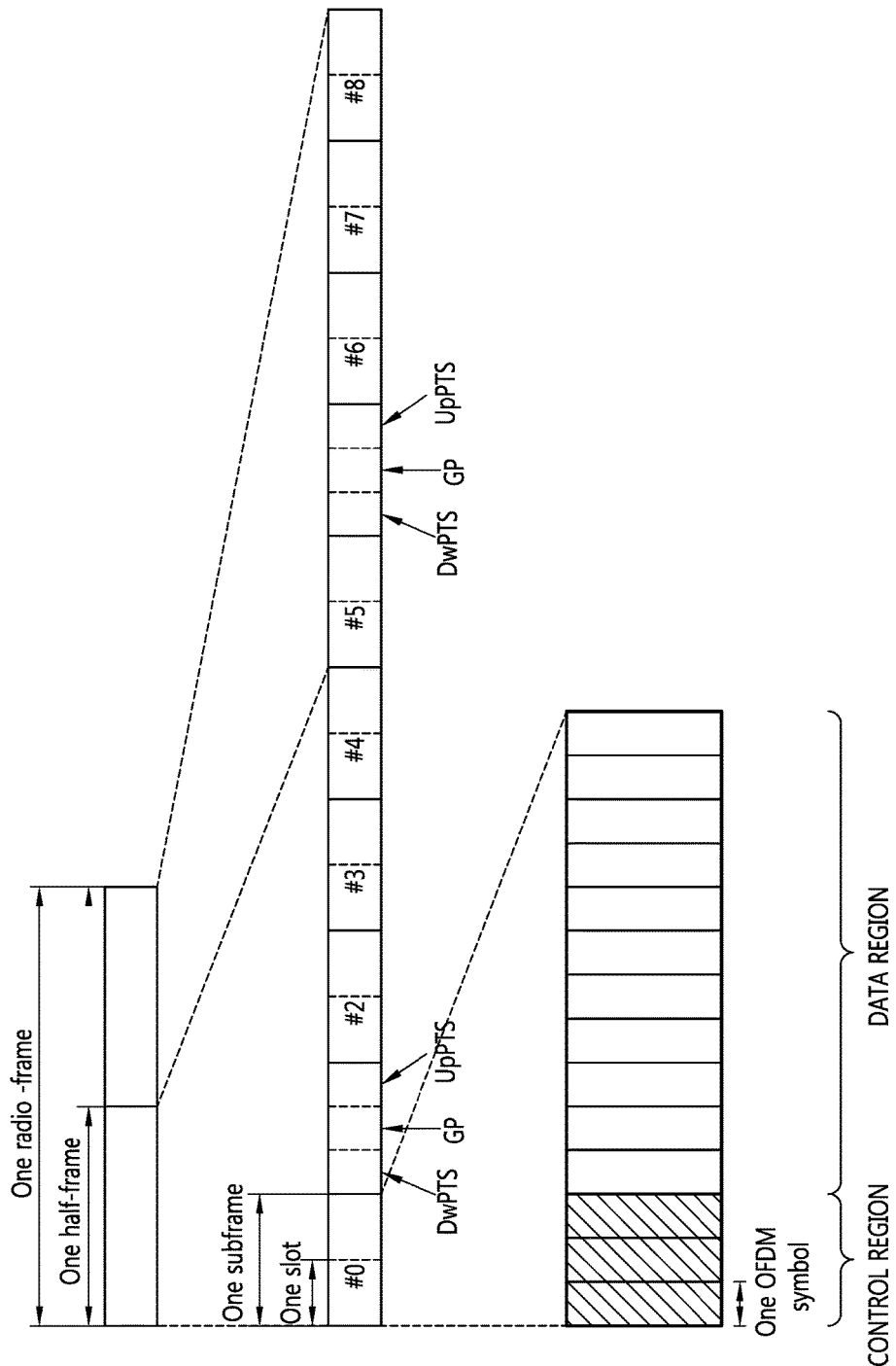
FIG. 3 illustrates the architecture of a downlink radio frame according to TDD in 3GPP LTE.

FIG. 3 illustrates the architecture of a downlink radio frame according to TDD in 3GPP LTE.

For this, 3GPP TS 36.211 V8.7.0 (2009-05) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuraiotn | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

Figure 4:
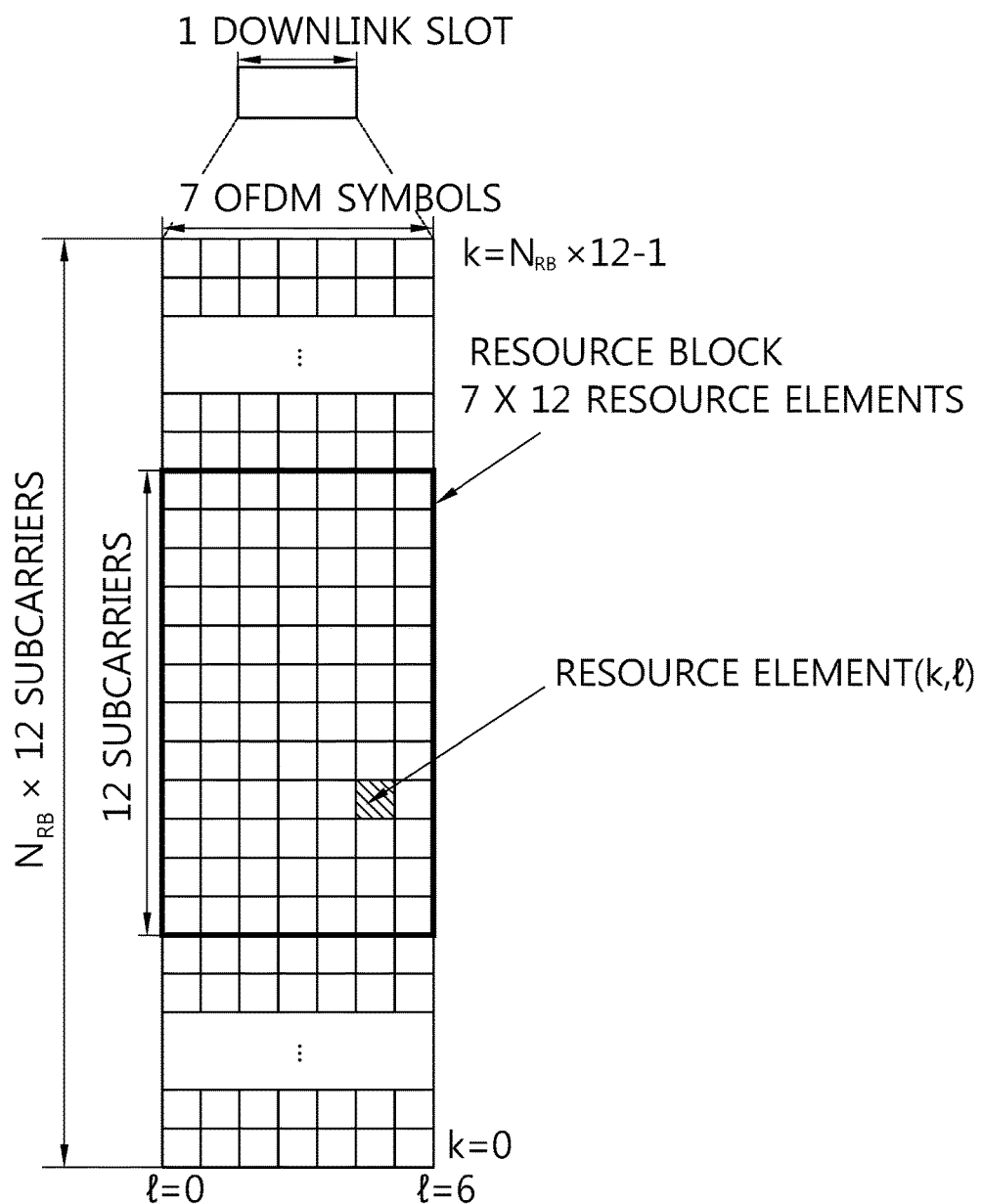
FIG. 4 is an exemplary diagram illustrating a resource grid with respec to one uplink or downlink slot in a 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and $N_{RB}$ resource blocks (RBs) in the frequency domain.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Figure 5:
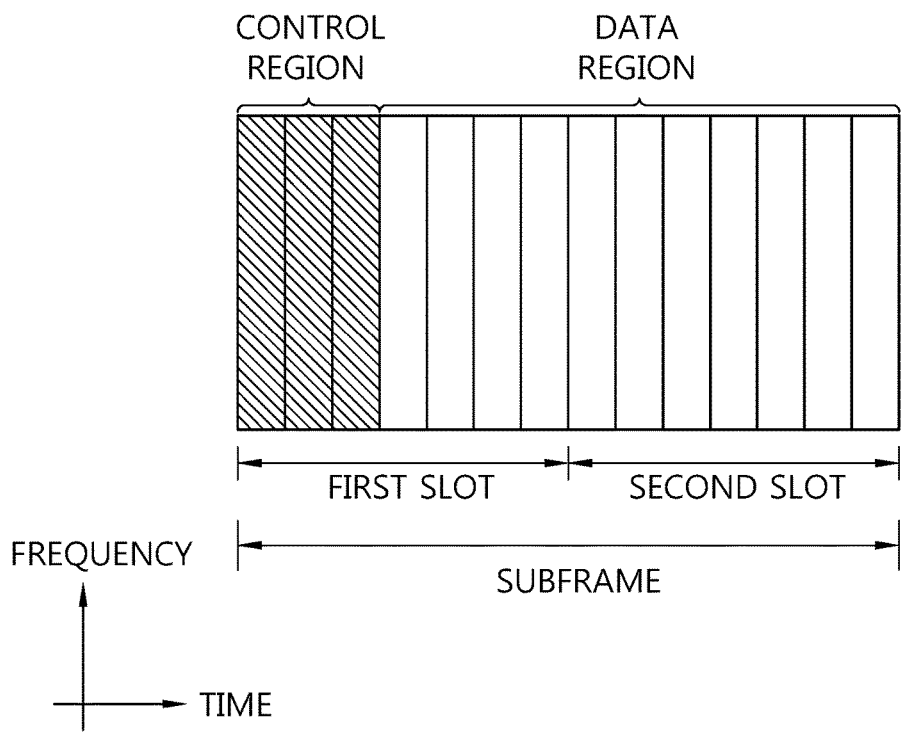
FIG. 5 illustrates the architecture of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The control region in the sub-frame includes a plurality of control channel elements (CCEs). The CCE is a logical allocation unit used to provide a coding rate according to a state of a wireless channel to the PDCCH, and corresponds to a plurality of resource element groups (REGs). The REG includes a plurality of resource elements. A format of the PDCCH and the possible bit number of the PDCCH are determined according to the relationship between the number of the CCEs and a coding rate provided to the CCEs.

One REG includes four REs and one CCE include nine REGs. In order to configure one PDCCH, {1, 2, 4, 8} CCEs may be used, and an element of each of the {1, 2, 4, 8} CCEs refers to a CCE aggregation level.

The base station determines the number of the CCEs to transmit the PDCCH according to a channel state. For example, one CCE is used in a terminal having an excellent downlink channel state to transmit the PDCCH. Eight CCEs are used in a terminal having a poor downlink channel state to transmit the PDCCH.

A control channel configured by at least one CCE performs interleaving of an REG unit, and is mapped to a physical resource after cyclic shift based on a cell identifier (ID) is performed.

Meanwhile, a terminal cannot know about a specific position in a control region in which its PDCCH is transmitted and about a specific CCE aggregation or DCI format used for PDCCH transmission. Since, a plurality of PDCCHs may be transmitted in one sub-frame, the terminal monitors the plurality of PDCCHs in every sub-frame. Monitoring is an operation of attempting PDCCH decoding by the wireless device according to a format of the monitored PDCCH.

The 3GPP LTE uses a search space to reduce an overload caused by the blind decoding. The search space may also be called a monitoring set of a CCE for the PDCCH. The UE monitors the PDCCH within a corresponding search space.

When the terminal monitors the PDCCH by using the C-RNTI, a search space and a DCI format used in monitoring are determined according to a transmission mode of the PDSCH. Table 2 below shows an example of PDCCH monitoring in which the C-RNTI is set.

TABLE 2

| Transmission mode | DCI format | Search space | Transmission mode of PDSCH according to PDCCH |
|---|---|---|---|
| Transmission mode 1 | DCI format 1A | Public service and terminal specific | Single antenna port, port 0 |
| | DCI format 1 | Terminal specific | Single antenna port, port 0 |

TABLE 2-continued

| Transmission mode | DCI format | Search space | Transmission mode of PDSCH according to PDCCH |
|---|---|---|---|
| Transmission mode 2 | DCI format 1A | Public service and terminal specific | Transmit diversity |
| | DCI format 1 | Terminal specific | Transmit diversity |
| Transmission mode 3 | DCI format 1A | Public service and terminal specific | Transmit diversity |
| | DCI format 2A | Terminal specific | CDD(Cyclic Delay Diversity) or transmit diversity |
| Transmission mode 4 | DCI format 1A | Public service and terminal specific | Transmit diversity |
| | DCI format 2 | Terminal specific | Closed-loop spatial multiplexing |
| Transmission mode 5 | DCI format 1A | Public service and terminal specific | Transmit diversity |
| | DCI format 1D | Terminal specific | MU-MIMO(Multi-user Multiple Input Multiple Output) |
| Transmission mode 6 | DCI format 1A | Public service and terminal specific | Transmit diversity |
| | DCI format 1B | Terminal specific | Closed-loop spatial multiplexing |
| Transmission mode 7 | DCI format 1A | Public service and terminal specific | If the number of PBCH transmisison ports is 1, single antenna port, port 0. Otherwise, transmit diversity |
| | DCI format 1 | Terminal specific | Single antenna port, port 5 |
| Transmission mode 8 | DCI format 1A | Public service and terminal specific | If the number of PBCH transmisison ports is 1, single antenna port, port 0. Otherwise, transmit diversity |
| | DCI format 2B | Terminal specific | Dual layer transmisison (port 7 or 8), or single antenna port, port 7 or 8 |
| Transmission mode 9 | DCI format 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2C | Terminal specific | 8 transmisison layers, ports 7-14 are used or port 7 or 8 is used as independent antenna port |
| Transmission mode 10 | DCI 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2D | Terminal specific | 8 transmisison layers, ports 7-14 are used or port 7 or 8 is used as independent antenna port |

The usage of the DCI format is classified as shown in Table 3 below.

TABLE 3

| DCI format | Contents |
|---|---|
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

For example, a DCI format 0 will be described with reference to section 5.3.3.1.1 of 3GPP TS 36.212 V10.2.0 (2011-06). The DCI format 0 includes a field as listed in a following table.

TABLE 4

| Field | Bit number |
|---|---|
| Carrier indicator | 0 or 3 bits |
| Flag for format0/format1A differentiation | 1 bit |
| FH (Frequency hopping) flag | 1 bit |
| Resource block allocation and hopping resource allocation | |
| MCS(Modulation and coding scheme) and RV (redundancy version) | 5 bits |
| NDI (New data indicator) | 1 bit |
| TPC | 2 bits |
| Cyclic shift for DM RS and OCC index | 3 bit |

TABLE 4-continued

| Field | Bit number |
|---|---|
| UL index | 2 bits |
| DAI (Downlink Allocation Index) | 2 bits |
| CSI request | 1 or 2 bits |
| SRS request | 0 or 1 bit |
| Resource allocation type | 1 bit |

Figure 6:
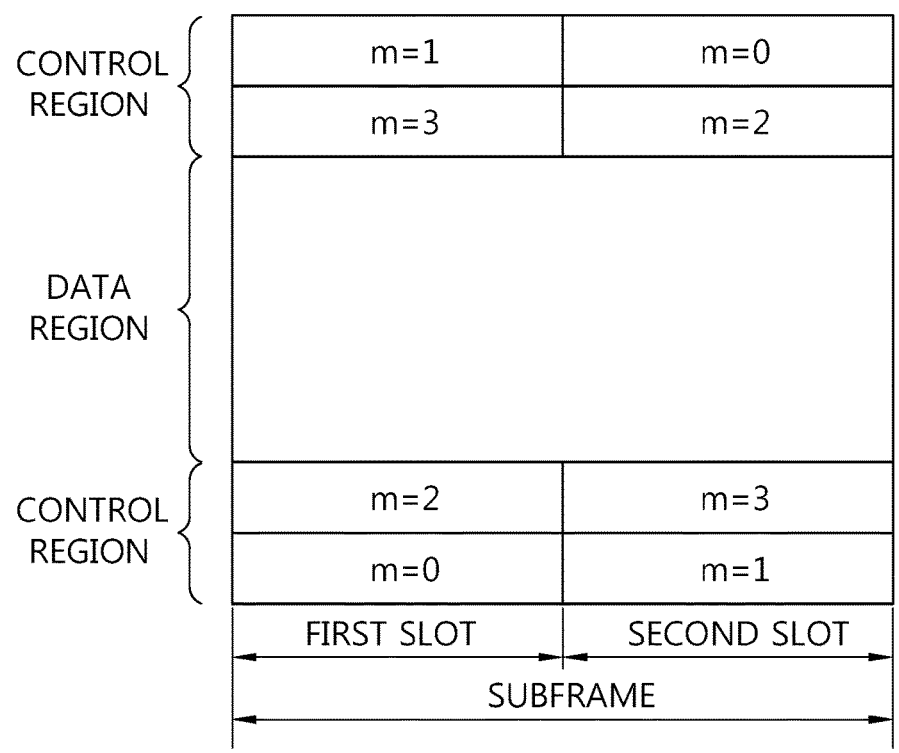
FIG. 6 illustrates the architecture of a UL sub-frame in 3GPP LTE.

FIG. 6 illustrates the architecture of a UL sub-frame in 3GPP LTE.

Referring to FIG. 6, the uplink sub-frame may be separated into a control region and a data region in the frequency domain. The control region is allocated a PUCCH (physical uplink control channel) for transmission of uplink control information. The data region is allocated a PUSCH (physical uplink shared channel) for transmission of data (in some cases, control information may also be transmitted).

The PUCCH for one user equipment is allocated in resource block (RB) pair in the sub-frame. The resource blocks in the resource block pair take up different sub-carriers in each of the first and second slots. The frequency occupied by the resource blocks in the resource block pair allocated to the PUCCH is varied with respect to a slot boundary. This is referred to as the RB pair allocated to the PUCCH having been frequency-hopped at the slot boundary. A frequency diversity gain may be obtained by transmitting uplink control information through different sub-carriers over time.

Since the UE transmits UL control information over time through different subcarriers, a frequency diversity gain can be obtained. In the figure, m is a location index indicating a logical frequency-domain location of the RB pair allocated to the PUCCH in the sub-frame.

Uplink control information transmitted on the PUCCH may include a HARQ ACK/NACK, a channel quality indicator (CQI) indicating the state of a downlink channel, a scheduling request (SR) which is an uplink radio resource allocation request, and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provided an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

FIG. 7 shows an example of comparing a single carrier system and a carrier aggregation system.

Referring to FIG. 7(a), the single carrier system supports only one carrier as to a UE in an uplink and a downlink. Although the carrier may have various bandwidths, only one carrier is allocated to the UE. Meanwhile, multiple component carriers (CCs), i.e., DL CCs A to C and UL CCs A to C, can be allocated to the UE in the carrier aggregation (CA) system. The CC implies a carrier used in the CA system, and may be simply referred to as a carrier. For example, three 20 MHz CCs can be allocated to allocate a 60 MHz bandwidth to the UE.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carriers are contiguous and the case where the control channels are non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Figure 8:
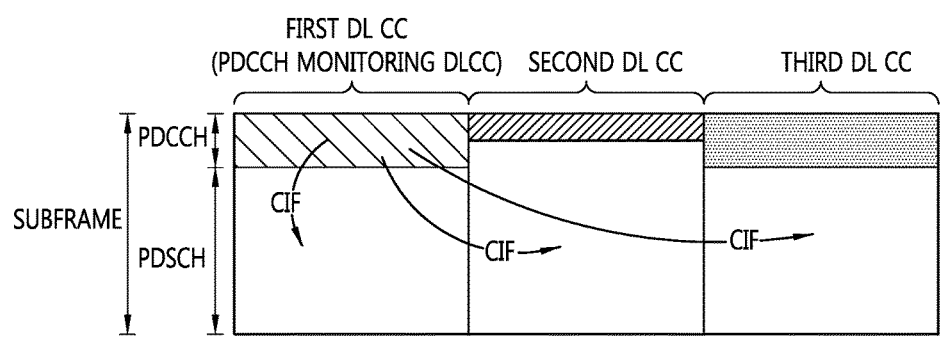
FIG. 8 illustrates cross-carrier sheduling in the carrier aggregation system.

FIG. 8 exemplifies cross-carrier scheduling in the carrier aggregation system.

Referring to FIG. 8, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-characteristically, UE group-characteristically, or cell-characteristically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Meanwhile, the LTE/LTE-A system acquires synchronization with a cell throgh a synchronization signal (SS) in a cell search procedure.

The SS will be described in detail with reference to the accompanying drawings.

Figure 9A:
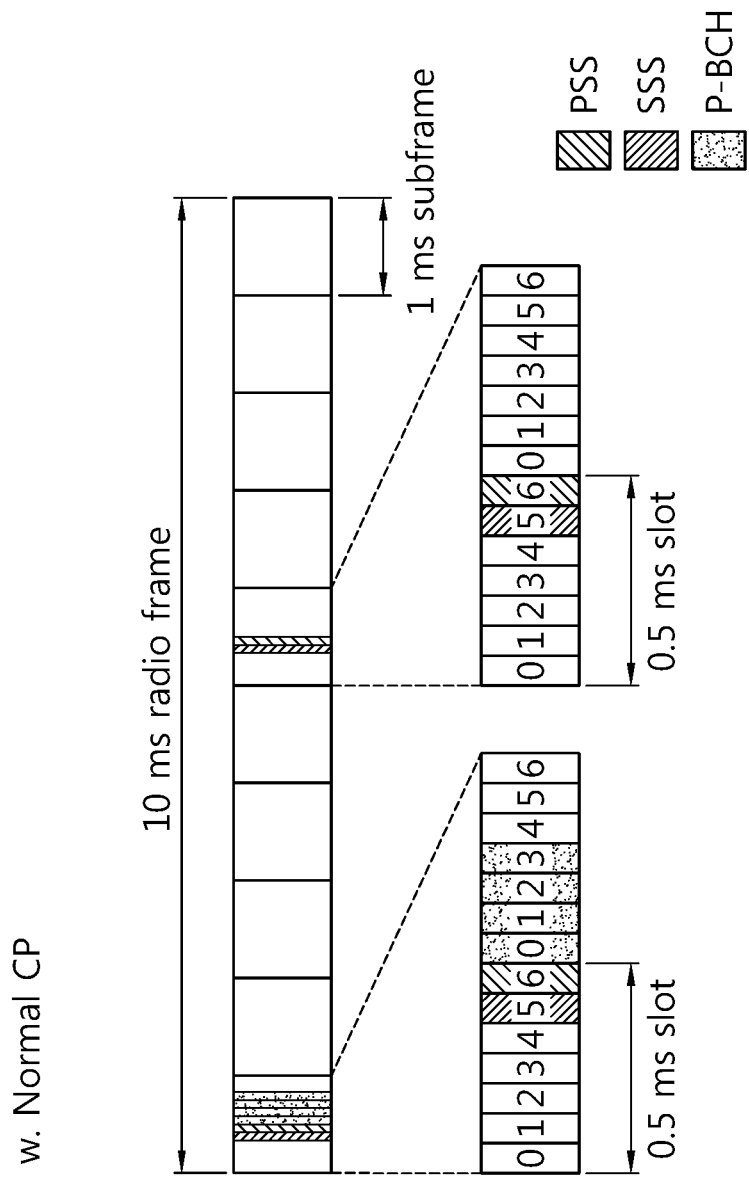
FIG. 9A and FIG. 9B illustrate a frame structure for transmitting a synchronous signal in a normal CP and an extended CP.
Figure 9B:
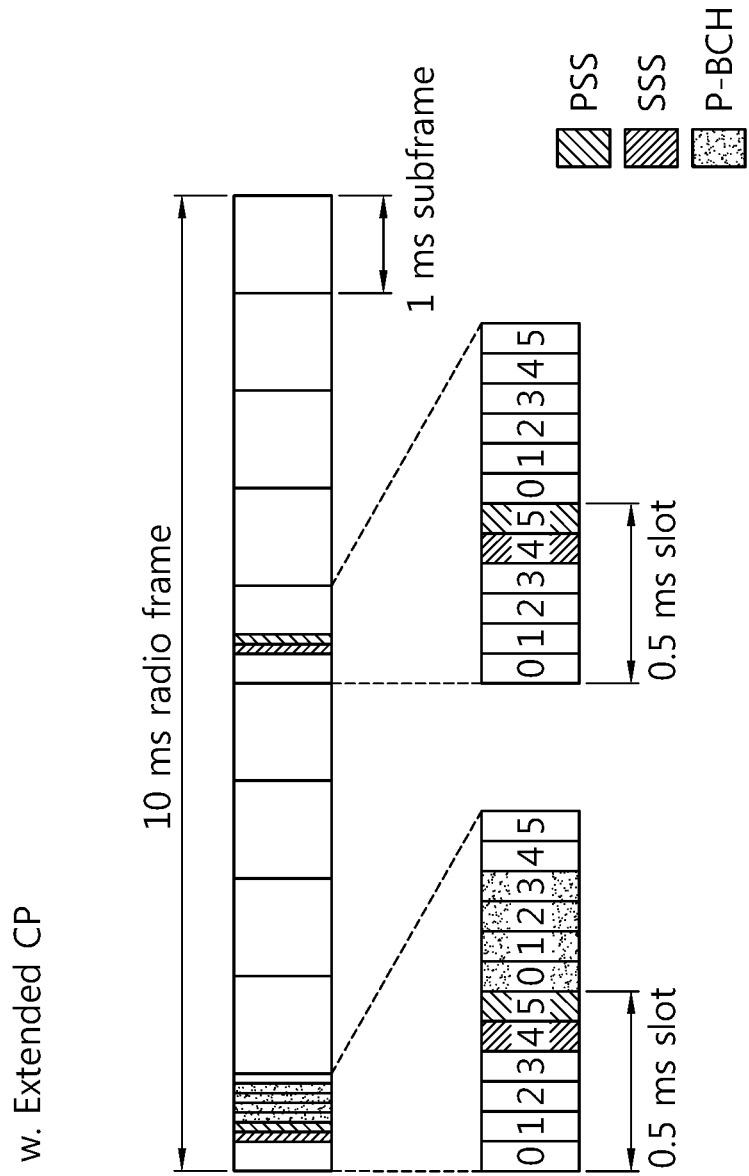

FIG. 9A and FIG. 9B illustrate a frame structure for transmitting a synchronous signal in a normal CP and an extended CP.

Referring to FIG. 9A and FIG. 9B, the SS is transmitted from a second slot of a sub-frame number 0 and a sub-frame number 5 by taking into consideration 4.6 ms being a GSM frame length for easy inter-RAT measurement, and a boundary with respect to a corresponding radio frame may be detected through a secondary synchronization signal (S-SS).

A primary synchronization signal (P-SS) is transmitted from a final OFDM symbol of a corresponding slot, and the S-SS is transmitted from an OFDM symbol just ahead of the P-SS.

The SS may allow so that total 540 physical cell IDs are transmitted through a combination of three P-SS and 168 S-SSs.

Further, the SS and a PBCH are transmitted from a center 6 RB in a system bandwidth so that the UE may detect or decode regardless of a transmission band.

The transmit diversity scheme of the SS uses only a single antenna port, but does not define in a standard.

That is, a single antenna transmission or a transmission scheme transparent to the UE (for example, PVS, TSTD, CDD) may be used.

Code of the P-SS

The P-SS defines a Zadoff-Chu (ZC) sequence of a length of 63 at a frequency domain and uses it as a sequence of the P-SS.

The ZC sequence is defined by a following sequence, a sequence element corresponding to a DC sub-carrier n=31 is punctured.

9 remaining sub-carriers among 6 RB (=72 sub-carriers) of a center part are always transmitted with a value of 0, and provide easy filter design for performing synchronization.

$$d_u(n) = e^{-j\frac{\pi u n(n+1)}{N_{ZC}}}$$ [Equation 1]

where, $N_{ZC}=63$, the n represents a sequence element, the u uses 25, 29, and 34 in order to define total 3 P-SSs.

In this case, the 29 and the 34 have a conjugate symmetry relation so that two correlations may be simultaneously performed.

In this case, the conjugate symmetry means relationship expressed by a following equation 2, and one-shot correlator with respect to u=29 and 34 may be implemented so that a total calculation amount may be reduced by 33.3%.

[Equation 2]

$d_u(n)=(-1)^n(d_{N_{ZC}-u}(n))^*$, when $N_{ZC}$ is even number $d_u(n)=(d_{N_{ZC}-u}(n))^*$, when $N_{ZC}$ is odd number. [Equation 2]

Code of S-SS

In a sequence used of the S-SS, two m-sequences of a length 31 is generated through an interleaved conjugation, and two sequences are combined so that 168 cell group IDs are transmitted.

As a sequence of the S-SS, an m-sequence is robust to a frequency selective environment, and a calculation amount may be reduced using a fast m-sequence transform using Fast Hadamard Transform. Further, the S-SS is configured by two short codes in order to reduce a calculation amount of the terminal.

Figure 10:
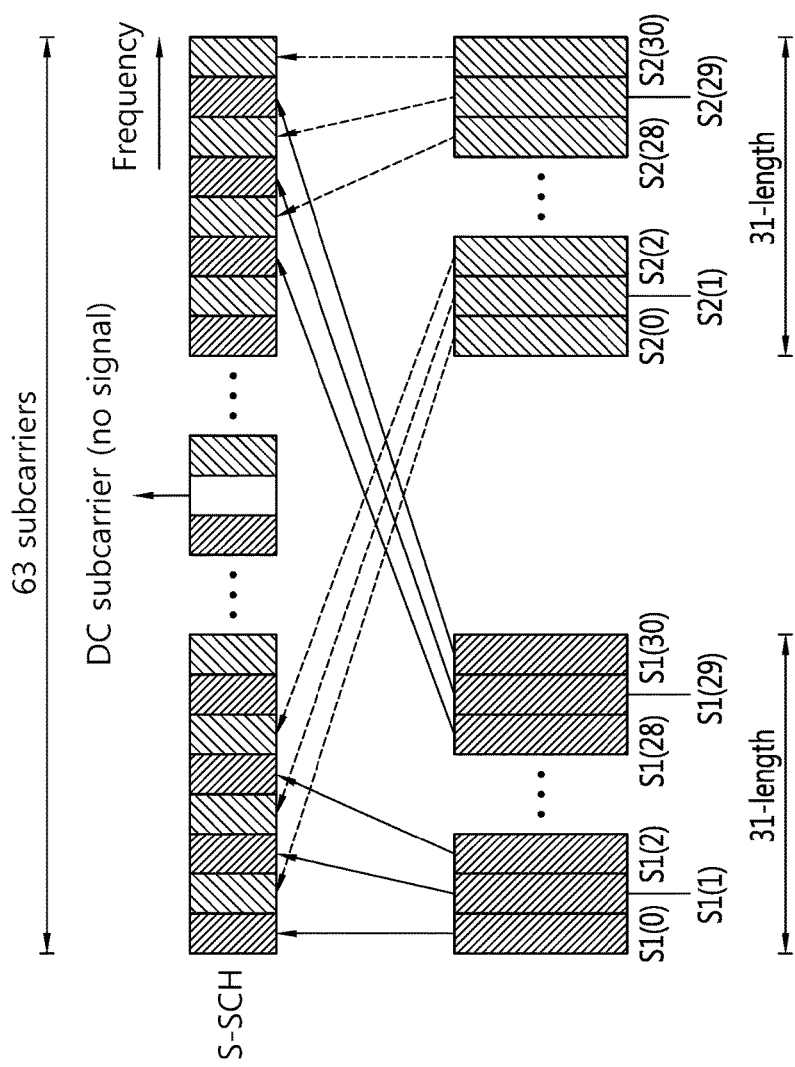
FIG. 10 illustrates two sequences in a logic area is interleaved and mapped to a physical area.

FIG. 10 illustrates two sequences in a logic area is interleaved and mapped to a physical area.

Referring to FIG. 10, if two m-sequences used to generate a S-SS code are defined as S1 and S2, the S-SS of the sub-frame 0 transmits a cell group ID by a combination of (S1, S2), the S-SS of the sub-frame 5 is swapped and transmitted to (S2, S1) so that a 10 ms frame boundary may be identified.

In this case, a used S-SS code uses generation polynomial of x5+x2+1, and may generate total 31 codes through different circular shifts.

In order to improve reception performance, P-SS-based different sequences are scrambled to the S-SS by defining the P-SS-based different sequences and different sequences may be scrambled to S1 and S2.

Next, the S2 is scrambled by defining a S1-based scrambling code.

In this case, a code of the S-SS is replaced in a 5 ms unit but the P-SS based scrambling code is not replaced.

The P-SS based scrambling code is defined as 6 circular shift versions according to a P-SS index in a m-sequence generated from the generation polynomial of the $x^5+x^3+1$, and the S1 based scrambling code is defined as 8 circular shift versions according to a S1 index in a m-sequence generated from the generation polynomial of the $x^5+x^4+x^2+x^1+1$.

Meanwhile, the LTE/LTE-A requires channel estimation in order to receive (or demodulate) data through a wireless channel (that is, frequency selective channel, frequency selective channel), and uses a Reference Signal (RS) for channel estimation.

The RS may be classified into two types including a RF for demodulation and a RF for channel measurement.

Further, the RS may be classified into a DRS (dedicated RS) and a CRS (common RS). In this case, the DRS is a reference signal known to a specific UE, which is a UE-specific RS. The CRS is a reference signal known to all UEs, which may be a cell-specific RS.

Further, a CSI-RS (channel status information-reference signal) is defined for channel state estimation in addition to the CRS.

Hereinafter, the reference signal will be described in detail with reference to the accompanying drawings.

Figure 11:
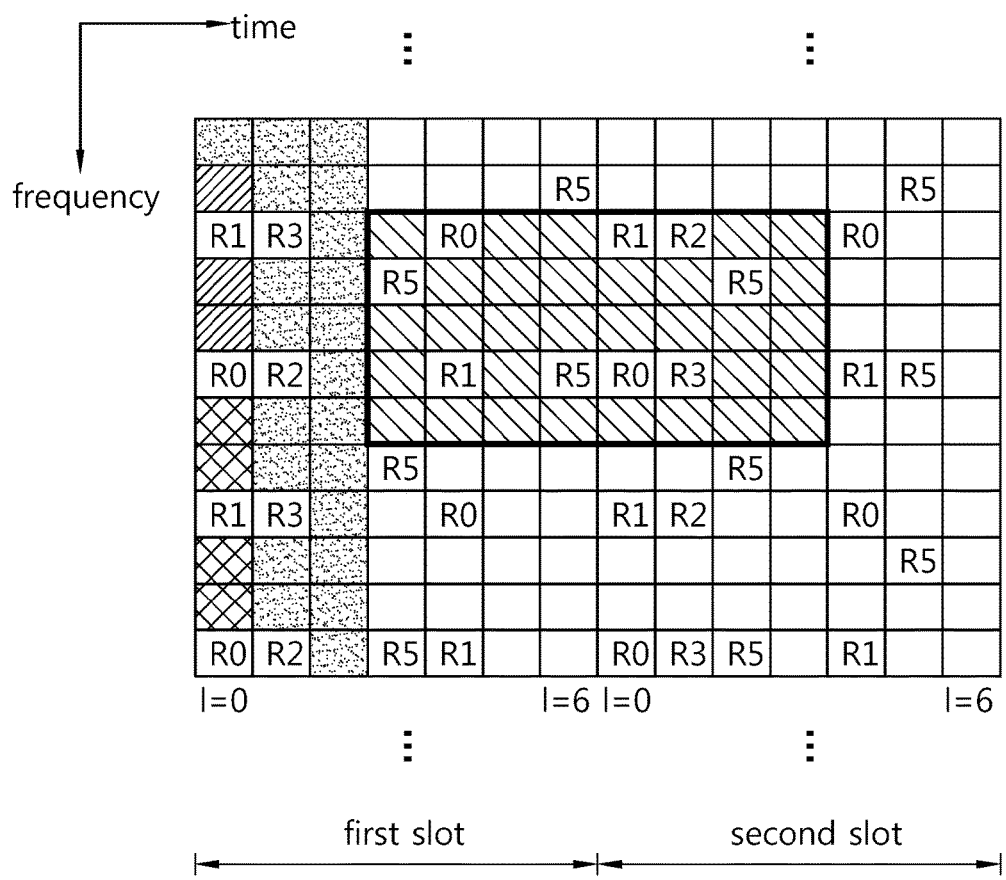
FIG. 11 illustrates an example of arranging a reference signal and a conrol channel in a DL sub-frame of the 3GPP LTE.

FIG. 11 illustrates an example of arranging a reference signal and a control channel in a DL sub-frame of the 3GPP LTE.

Referring to FIG. 11, a control area (or PDCCH area) includes three previous OFDM symbols, a data area to which the PDSCH is transmitted include remaining OFDM symbols.

PCFICH, PHICH and/or PDCCH are transmitted in the control area. A CFI of the PCFICH indicates three OFDM symbols. An area of the control area except for a resource to which the PCFICH and/or the PHICH are transmitted becomes a PDCCH area to monitor the PDCCH.

Moreover, various reference signals are transmitted to a sub-frame.

All wireless devices in a cell may receive a CRS (cell-specific reference signal) and the CRS is transmitted through the whole downlink band. In the drawings, 'R0' represents a RE (resource element) to which a CRS with respect to a second antenna port is transmitted, 'R1' represents an RE to which a CRS with respect to the second antenna port is transmitted, 'R2' represents a RE to which a CRS with respect to a third antenna port is transmitted, and 'R3' represents a RE to which a CRS with respect to a fourth antenna port is transmitted.

A RS sequence $r_{l,ns}(m)$ for the CRS is defined as follows.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

where, m=0, 1, ..., $2N_{maxRB}-1$, the $N_{maxRB}$ represents the maximum number of the RB, the ns represents a slot number of a radio frame, and the l represents an OFDM symbol number in a slot.

A pseudo-random sequence c(i) is defined by a gold sequence of a length 31.

$c(n)=(x_1(n+Nc)+x_2(n+Nc))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$ [Equation 4]

where, Nc=1600, and a first m-sequence is initialized to $x_1(0)=1$, $x_1(n)=0$, m=1, 2, ..., 30.

A second m-sequence starts from each OFDM and is initialized to $c_{init}=2^{10}(7(ns+1)+l+1)(2N^{cell}_{ID}+N_{CP}$. The $N^{cell}_{ID}$ represents a PCI (physical cell identity) of a cell, $N_{CP}=1$ in a normal CP, and $N_{CP}=0$ in an extended CP.

A URS (UE-specific Reference Signal) is transmitted to the sub-frame. The CRS is transmitted to the whole area of the sub-frame, but the URS is transmitted into a data area of the sub-frame and is used to demodulate a corresponding PDSCH. In the drawings, the 'R5' represents a RE to which the URS is transmitted. The URS refers to a DRS (dedicated Reference Signal) or a DM-RS (Demodulation Reference Signal).

The URS is transmitted to only a RE to which a corresponding PDSCH is mapped. A R5 is expressed in addition to an area to which the PDSCH is transmitted in the drawings, which indicates a location of an RE mapped to the URS.

The URS is used in only a wireless device to receive a corresponding PDSCH. A RS sequence $r_{ns}(m)$ for the URS is the same as that in the equation 3. In this case, m=0, 1, ..., $12N_{PDSCH,RB}-1$, and the $N_{PDSCH,RB}$ represents the number of RBs of corresponding PDSCH transmission. A pseudo random sequence generator starts from each sub-frame and is initialized to $c_{init}=(\text{floor}(ns/2)+1)(2N^{cell}_{ID}+1)2^{16}+n_{RNTI}$. The nRNTI represents an ID of a wireless device.

The above is a case of transmitting the URS through a single antenna. When the URS is transmitted through a multiple antenna, the pseudo random sequence generator starts from each sub-frame and is initialized to $c_{init}=(\text{floor}(ns/2)+1)(2N^{cell}_{ID}+1)2^{16}+n_{SCID}$. The $n_{SCID}$ represents a parameter obtained from a DL grant (for example, DCI format 2B or 2C) associated with PDSCH transmission.

Meanwhile, a mapping rule to a RE (Resource Element) to a RB (Resource Block) with respect to the CRS is described in a following equation 5.

$$k = 6m + (v + v_{shift})\bmod 6 \quad \text{[Equation 5]}$$

$$l = \begin{cases} 0, N^{DL}_{symb}-3 & \text{if } p \in \{0, 1\} \\ 1 & \text{if } p \in \{2, 3\} \end{cases}$$

$$m = 0, 1, ..., 2 \cdot N^{DL}_{RB}-1$$

$$m' = m + N^{max,DL}_{RB} - N^{DL}_{RB}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N^{cell}_{ID} \bmod 6$$

where, the v and $v_{shift}$ (V-shift value) are defined as a location in a frequency domain with respect to different reference signals.

The cell-specific frequency shift, or v-shift is given (determined) according to the above $v_{shift}$.

Moreover, a mapping rule to a RE (Resource Element) to a RB (Resource Block) with respect to the CRS is described in a following equation 6.

$$\text{Normal } CP \quad \text{[Equation 6]}$$

$$k = (k')\bmod N^{RB}_{sc} + N^{RB}_{sc} \cdot n_{PRB}$$

$$k' = \begin{cases} 4m' + v_{shift} & \text{if } l \in \{2, 3\} \\ 4m' + (2 + vf_{shift})\bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

-continued $$m' = 0, 1, \ldots, 3N_{RB}^{PDSCH} - 1$$

Extended CP $$k = (k') \bmod N_{sc}^{RB} + N_{sc}^{RB} \cdot n_{PRB}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

where, the m' represents a counter of UE-specific reference signal resource elements in a corresponding OFDM symbol of PDSCH transmission, the k and the p represent a sub-carrier index, and the $N_{RB}^{DL}$, the $n_s$ and the $N_{ID}^{cell}$ represent the number of RBs allocated to each DL, a slot index, and a cell ID.

Figure 12:
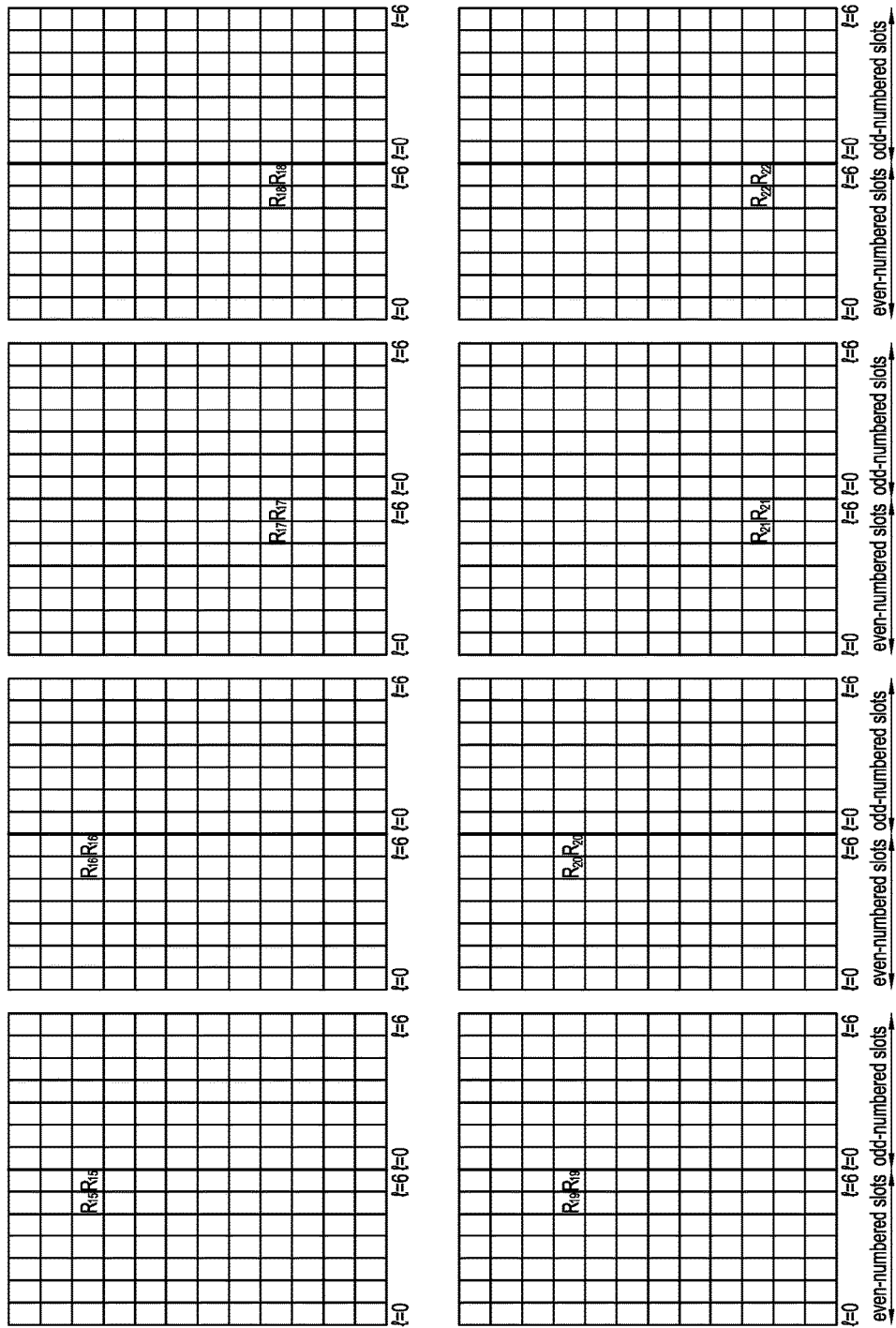
FIG. 12 illustrates an example of CSI-RS mapping.

FIG. 12 illustrates an example of CSI-RS mapping.

For the channel state estimation, CSI-RS (channel status information-reference signal) is defined in addition to the CRS for channel state estimation. The CSI-RS has maximum 32 different settings in order to reduce inter-cell interference in a multiple cell environment unlike the CRS.

Setting of the CSI-RS is changes according to the number of antenna ports in a cell, and maximum different settings are given between adjacent cells. The CSI-RS is classified according to a CP type. The CSI-RS is divided into setting of applying all of a frame structure type 1 and a frame structure type 2 and setting of apply only the frame structure type 2 according to a frame structure type (frame structure type 1 is FDD, and frame structure type 2 is TDD).

The CSI-RS supports maximum 8 antenna ports. The antenna port p supports {15}, {15, 16}, {15,16,17,18}, {15, . . . , 22}. That is, the antenna port p supports 1, 2, 4, and 8 antenna ports.

The RS sequence $r_{n_s}(m)$ for the CSI-RS is the same as that of the equation 1. In this case, the pseudo random sequence generator starts from each OFDM symbol and is initialized to $c_{init} = 210(7(ns+1)+l+1)(2N_{ID}^{csi}+1)+2N_{ID}^{csi}+N_{CP}$. If not particularly set, $N_{ID}^{csi}$ is the same as $N_{ID}^{cell}$. $N_{CP}=1$ in a normal CP. $N_{CP}=0$ in the extended CP.

In the sub-frames configured to transmit the CSI-RS, the reference signal sequence $r_{n_s}(m)$ is mapped to a complex value modulation symbol $a_{k,l}^{(p)}$ used as a reference symbol with respect to the antenna port p as described in a following equation.

$$a_{k,l}^{(p)} = w_{l''} \cdot r_{l,n_s}(m') \qquad \text{[Equation 7]}$$

where $$k = k' + 12m + \begin{cases} -0 & \text{for } p \in \{15, 16\}, \text{normal } CP \\ -6 & \text{for } p \in \{17, 18\}, \text{normal } CP \\ -1 & \text{for } p \in \{19, 20\}, \text{normal } CP \\ -7 & \text{for } p \in \{21, 22\}, \text{normal } CP \\ -0 & \text{for } p \in \{15, 16\}, \text{extended } CP \\ -3 & \text{for } p \in \{17, 18\}, \text{extended } CP \\ -6 & \text{for } p \in \{19, 20\}, \text{extended } CP \\ -9 & \text{for } p \in \{21, 22\}, \text{extended } CP \end{cases}$$

$$l = l' + \begin{cases} l'' & \text{CSI-RS configurations 0-19, normal } CP \\ 2l'' & \text{CSI-RS configurations 20-31, normal } CP \\ l'' & \text{CSI-RS configurations 0-27, extended } CP \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In the equation 7, the (k', l') and the ns may be given in a following table 5. The CSI-RS may be transmitted from a downlink slot in which a (ns mod 2) satisfies a condition of a table 1 to be described below.

Table 5 lists an example of CSI-RS setting with respect to the normal CP.

TABLE 5

| | | Number of CSI reference signals configured | | | | | |
|---|---|---|---|---|---|---|---|
| | | 1 or 2 | | 4 | | 8 | |
| CSI reference signal configuration | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |

TABLE 5-continued

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| | 18 | (3, 5) | 1 | | | | |
| | 19 | (2, 5) | 1 | | | | |
| Frame structure type | 20 | (11, 1) | 1 | (11, 1) | 1 | (11, 1) | 1 |
| 2 only | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

A sub-frame including the CSI-RS satisfies a following equation 8.

$$10 n_f + \lfloor n_s/2 \rfloor - \Delta_{CSI-RS} \bmod T_{CSI-RS} = 0 \quad \text{[Equation 8]}$$

where, the of represents a system frame number, and the $\Delta_{CSI-RS}$ and the $T_{CSI-RS}$ are given as follows according to configuration of the CSI-RS sub-frame.

TABLE 6

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

The 'CSI-RS-Sub-frameConfig' $I_{CSI-RS}$ is a value given by an upper layer and indicates CSI-RS sub-frame configuration. The $T_{CSI-RS}$ represents a cell specific sub-frame configuration period. The $\Delta_{CSI-RS}$ represents a cell specific sub-frame offset. The CSI-RS supports five types of duty cycles according to CSI feedback. The CSI-RS may be transmitted to have different sub-frame offsets in each cell.

In an example of FIG. 12, two antenna ports, for example, the CSI-RS is transmitted using the same two continuous resource components with respect to p={15, 16}, {17, 18}, {19, 20}, {21, 22}, and is transmitted using an OCC (orthogonal cover code). Each CSI-RS is allocated to have a specific pattern in a radio resource area according to CSI-RS configuration. In the above meaning, a radio resource configuration for the CSI-RS at a corresponding antenna port refers to a CSI-RS pattern.

Resource components k and l used to transmit a CSI-RS with respect to an optional antenna port of a group S are not used to transmit the PDSCH with respect to an optional antenna port in the same slot. Further, the resource components k and l are not used to transmit the CSI-RS with respect to other optional antenna port except for the S in the same slot. In this case, the antenna port included in the group S includes {15, 16}, {17,18}, {19,20}, and {21, 22}

Meanwhile, a sequence of the PRS (Positioning reference signal) is defined by a following equation 9.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 9]}$$

$$m = 0, 1, \ldots, 2N_{RB}^{max,DL} - 1$$

where, the ns represents a slot number in one radio frame, the l represent an OFDM symbol number in the slot, the c(i) represents a pseudo-random sequence defined in the equation 4.

Meanwhile, a mapping rule to a RE (Resource Element) to a RB (Resource Block) with respect to the CRS is described in a following equation 10.

Normal CP [Equation 10]

$$k = 6(m + N_{RB}^{DL} - N_{RB}^{PRS}) + (6 - l + v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and } (1 \text{ or } 2 \text{ } PBCH \text{ antenna ports}) \\ 2, 3, 5, 6 & \text{if } n_s \bmod 2 = 1 \text{ and } (4 \text{ } PBCH \text{ antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

Extended CP $$k = 6(m + N_{RB}^{DL} - N_{RB}^{PRS}) + (5 - l + v_{shift}) \bmod 6$$

$$l = \begin{cases} 4, 5 & \text{if } n_s \bmod 2 = 0 \\ 1, 2, 4, 5 & \text{if } n_s \bmod 2 = 1 \text{ and } (1 \text{ or } 2 \text{ } PBCH \text{ antenna ports}) \\ 2, 4, 5 & \text{if } n_s \bmod 2 = 1 \text{ and } (4 \text{ } PBCH \text{ antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

$$v_{shift} = N_{ID}^{cells} \bmod 6$$

where, $N_{RB}^{PRS}$ is set by an upper layer.

<Small Cell Cluster Environment>

Meanwhile, when an existing LTE-A system aggregates and uses a plurality of component carriers (CCs), data transmission, acquisition of a cell ID, transmission of system information, and transmission of a physical control signal are possible so that there are a primary CC (PCC, Pcell) capable of perform access of an independent CC, and transmission/reception of control signal and data, and a Secondary CC (SCC, Scell) capable of performing transmission/reception of data if the CCs are aggregated together the PCC.

The existing LTE-A system uses a scheme which transmits ACK/NACK with respect to a plurality downlink (DL) transmitted through a plurality of CCs through the PCC.

A next system of the LTE-A takes into consideration an environment to establish a plurality of small cells or a small-scaled cell or an environment using a plurality of small cells together with a macro cell. In this case, the small cell may be used as Pcell of specific US, and a corresponding small cell may be used as only a Scell.

That is, the environment using a plurality of small cells together with a macro cell may signify an environment including a plurality of small-scaled cells grouped in a cluster unit.

In detail, in order to cope with increase in moving traffic of an indoor hotspot and an outdoor hotspot, small cells using low power nodes are considered.

In this case, the low power node may mean a macro node and a node having transmission power lower than that of base station classes.

Improvements of a small cell for E-UTRA and E-UTRAN are focused on additional functions for ensuring improved performances in indoor and outdoor hotspot zones using low power nodes.

A mechanism for efficiently ensuring a small cell operation includes following contents.

On/off mechanism of interference avoidance between small cells adopted to a change traffic and small on/off mechanisms for interference coordination. In this case, there is a need to specify a mechanism for waking or turning-off cells and necessary measurement and procedure.

Physical signals to assist adaptation of a search signal (or discovery signal) of DL/UL Improved procedures to reduce transition of flexible time scales Improved procedures, measurements and network load/utilization metrics for determining coordinated network intention Note: when there is at least one component carrier, the small cell may refer one component carrier.

Introduction of efficient discovery procedures with respect to UEs for searching a suitable number small cells operating in a single or multiple carrier in one short time period by taking into consideration small cell on/off mechanisms.

Introduction of mechanisms inter-cell synchronization, for example, network listening and UE assisted synchronization based radio interface in order to accomplish synchronization between a small cell and an overlaid macro cell, synchronization between small cells existing in the same small cell group or a small cell cluster, and synchronization between small cell clusters.

Figure 13A:
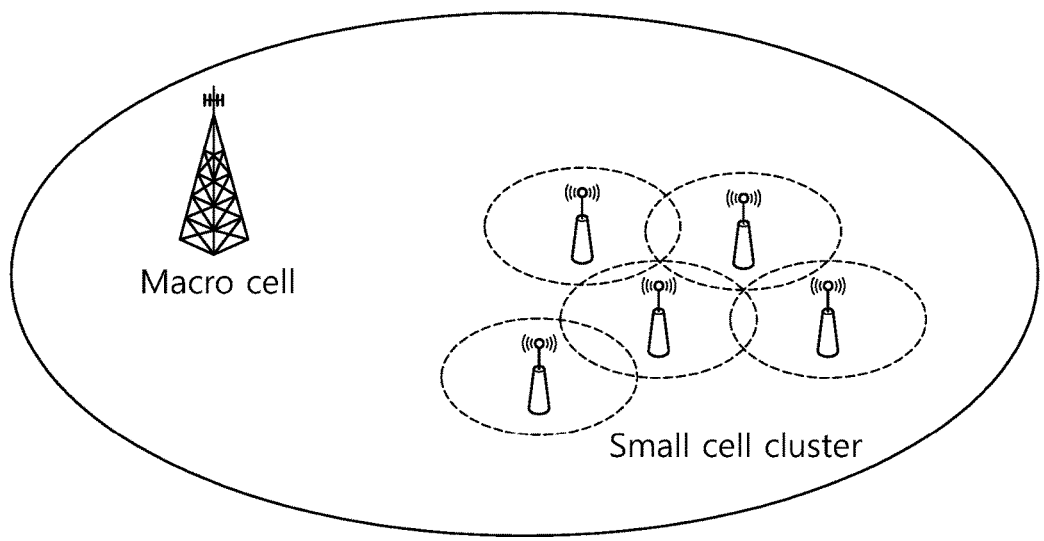
FIG. 13A and FIG. 13B illustrate an example of a small cell cluster environment including a plurality of small cells.
Figure 13B:
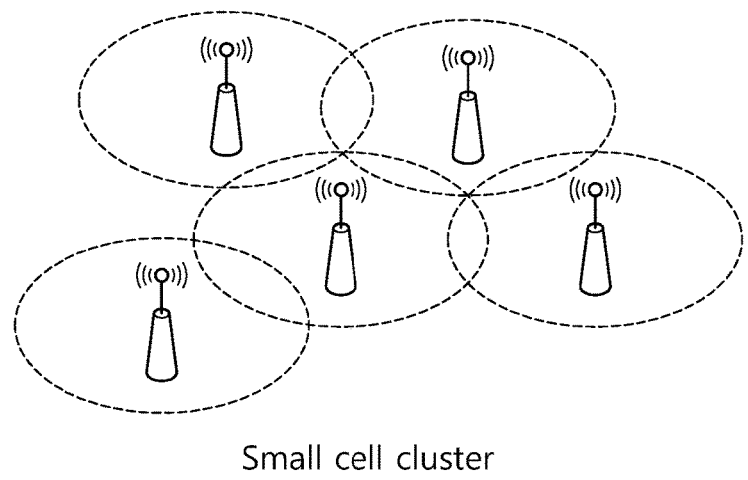

FIG. 13A and FIG. 13B illustrate an example of a small cell cluster environment including a plurality of small cells.

Referring to FIG. 13A and FIG. 13B, a plurality of small cells may include a small cell group or a small cell cluster.

As shown in FIG. 13A, the small cell cluster may be located in coverage of a macro cell. As shown in FIG. 3B, the small cell cluster may independently located outside coverage of the macro cell. In this case, the small cells located in the same cluster may be operated with the same carrier frequency.

<Disclosures of the Present Invention>

I. First Disclosure of the Present Invention: Introduction of Discovery Signal or Search Signal and Characteristics of Signals Meanwhile, the first disclosure of the present invention suggests that a small cell or a small-scaled cell generates and transmits a new search signal or a discovery signal (DS) in addition to existing PSS/SSS so that the UE efficiently detects small cells or small-scaled cells which are densely located (Introduction of efficient discovery procedures with respect to UEs for finding a suitable number of small cells operating in a single or multiple carrier in one short time period by taking into consideration the above small cell on/off mechanisms).

That is, there is a need for introduction of a cell search procedure using the new search signal or the discovery signal (DS) or a cell discovery procedure in the small cell environment.

The new search signal and the discovery signal are a new type of signal, and may signify a signal which is transmitted through a plurality of sub-frames upon one transmission and is periodically transmitted with a long period.

In this case, the signal of the long period (new search signal and discovery signal) may be transmitted in a bundle unit through a plurality of sub-frames upon one transmission.

The long period may means a long period (for example, 200 msec) of 50 msec or greater.

The small cell may perform on/off of a cell based on a case of stopping transmission without active UE or some pattern.

Under the assumption, a search signal or a discovery signal (DS) based on PSS/SSS/CRS or CSI-RS may be transmitted every T msec. For example, the T may be 200.

Only when the cell is in an off state, the above search signal or discovery signal may be periodically transmitted. The above search signal or discovery signal may be periodically transmitted regardless of an on/off state.

That is, the signal (search signal or discovery signal) is received from an optional small-scaled cell among a plurality small-scaled cells grouped in a cluster unit. Even if the optional small-scaled cell is in an off state, the above signal is received. Signals different from the above signal may not be received in an off state of the optional small scaled cell.

Hereinafter, the search signal or the discovery signal is discovery signal for the purpose of description. However, the scope of the present invention is not limited to the above title. It will be understood by those skilled in the art that various names may be used or applied with respect to the search signal and the discovery signal.

Figure 14:
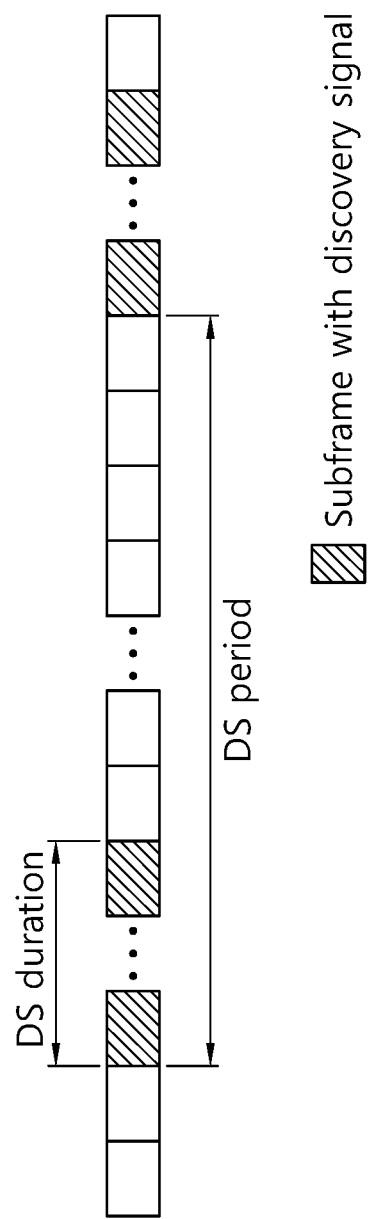
FIG. 14 is an exemplary diagram illustrating characteristics of a search signal and a discovery signal according to a first embodiment of the present invention.

FIG. 14 is an exemplary diagram illustrating characteristics of a search signal and a discovery signal according to a first embodiment of the present invention.

Referring to FIG. 14, the discovery signal may be transmitted for a specific sub-frame duration, duration time, or duration interval. The sub-frame duration interval and duration time may be 1 sub-frame (1 msec) characteristically.

In the disclosures of the present invention, a duration when the discovery signal is transmitted refers to a DS duration, a DS duration time, or a DS duration interval.

Further, the discovery signal may be periodically transmitted one by one during a specific period (for example, 200 msec).

In the disclosure of the present invention, a transmission period of the discovery signal refers to a DS period.

Further, in the disclosures of the present invention, a (sub-frame) offset value for indicating a transmission start point of the discovery signal refers to a DS offset.

The DS offset may indicate a sub-frame number to indicate a start point of the discovery signal.

Further, the DS offset may indicate a start point of the discovery signal based on a sub-frame #0.

For example, the DS offset may indicate a point after 4 msec based on a sub-frame 0 or a sub-frame 4. In this case, the discovery signal may be transmitted from a point after 4 msec based on a sub-frame 0 or from the sub-frame 4.

Accordingly, the present invention discloses a discovery signal which starts from a start point (for example, specific sub-frame) indicated by the DS offset, maintains for a DS duration, and is periodically transmitted with the DS period.

That is, the discovery signal has a specific DS period and a DS offset value, and may be transmitted in the form of a bust or a bundle during 1 sub-frame or a DS duration interval.

The discovery signal may be a signal having a new form which is not included in an existing LTE/LTE-A system or may have an existing signal form.

For example, when the discovery signal has an existing signal form, the discovery signal may have resource element location and configuration identical or similar to the CRS (Cell-specific Reference Signal), the CSI-RS (Channel-State Information Reference Signal), or the PRS (positioning RS) and have a sequence identical or similar thereto.

That is, the discovery signal may have a form identical or similar to that of one of the CSI-RS (Channel-State Information Reference Signal), the CRS (Cell-specific Reference Signal), and the PRS (Positioning Reference Signal).

However, a new sequence, a new resource element (RE), or a new configuration may be used in the discovery signal.

When the discovery signal has a form of the CRS, a resource element location and a sequence of the discovery signal are the same as the resource element location and sequence of a CRS port 0 or a RE location and sequence of a v-shift form and (or) a symbol-shift form of a CRS port 0.

For example, the v-shift value of the CRS may be $v_{shift}=N_{ID}^{cell} \bmod 6$ of the equation 5.

Further, when the discovery signal has a form of the PRS, a resource element location and a sequence of the discovery signal are the same as the resource element location and the sequence of the PRS or a resource element location and a sequence of a v-shift form or (or and) a symbol-shift form of the PRS.

For example, the v-shift value of the PRS may be $v_{shift}=N_{ID}^{cell} \bmod 6$ of the equation 10.

When the discovery signal has a form of the CSI-RS, a resource element location and a sequence of the discovery signal are the same as the resource element location and the sequence of a CSI-RS port 15 or a resource element location and a sequence of a v-shift form or (or and) a symbol-shift form of the CSI-RS port 15.

In particular, the resource element location and the sequence of the discovery signal may be configured by a resource element location and a sequence corresponding to a port 15 among CSI-RS configurations.

Moreover, when a terminal does not know an SFN/sub-frame index during a procedure of generating a sequence, a part with respect to a sub-frame index or a slot index is not used or is fixed to a constant so that the discovery signal may be used.

A slot index, an SFN or a sub-frame index used in the discovery signal or the discovery configuration may match with a cell sensing a corresponding discovery signal or a cell transmitting information on a discovery signal with respect to a corresponding cell.

For example, when the macro cell sends assistance information (for example, configuration, offset, periodicity, cell ID, or the like) with respect to a discovery signal regarding all small cells in one small cell cluster, it is assumed that the SFN/sub-frame index matches or a used index matches with a macro cell sending assistance information. Accordingly, it may be assumed that the discovery signal is transmitted.

When the macro cell and an SFN/sub-frame index are not aligned, the small cell causes the terminal to detect the discovery signal.

Alternatively, it is assumed that an SFN/sub-frame index used in the discovery signal or the discovery signal configuration matches or a used index may match with an index of a cell (or PDSCH transmission cell) sending SCG sPCell, specific Scell, or assistance information by taking into consideration a case of a CA (Carrier Aggregation) environment or a dual connectivity.

Such timing may be used when discovery signal information with an OFDM symbol level as a sub-frame index are received.

In this case, the SCG sPCell may signify a cell capable of transmitting a PUCCH among serving cells which is a scell of the UE. In detail, the SCG sPCell may be limited to a serving-cell or a small cell having inter-site relation with a macro cell or a Pcell.

Meanwhile, since a plurality of small cells is located on a co-channel in the small cell environment, and is located close to each other, interference between cells is greater than interference between macro cells.

Accordingly, the disclosures of the present invention provides a method of reducing interference between discovery signals in an environment where a plurality of small cell clusters (or cluster) are close to each other.

In detail, the disclosures of the present invention provides a method of receiving a signal which is transmitted through a plurality of sub-frames upon one transmission from a plurality of small-scaled cells grouped in a cluster unit, has a long period, and is periodically transmitted.

The method includes: receiving the signal from an optional small-scaled cell among the plurality of small-scaled cells on a first sub-frame; and receiving the signal from the optional small-scaled cell on a second sub-frame. A location of a resource element in which the signal is received on the first sub-frame may be different from a location of a resource element in which the signal is received on the second sub-frame by changing the location of the resource element in which the signal is received according to a preset hopping pattern.

Further, a terminal or UE according to other disclosures of the present invention receives a signal which is transmitted through a plurality of sub-frames upon one transmission from a plurality of small-scaled cells grouped in a cluster unit, has a long period and is periodically transmitted. The terminal or the UE includes an RF unit to receive the signal and a processor which controls the RF unit to receive the signal from an optional small-scaled cell among a plurality of small-scaled cells on a first sub-frame, and to receive the signal from the optional cell on a second sub-frame. A location of a resource element in which the signal is received on the first sub-frame may be different from a location of a resource element in which the signal is received on the second sub-frame by changing the location of the resource element in which the signal is received according to a preset hopping pattern.

The location of the resource element in which the signal is received may be changed based on a specific reference.

In this case, the specific reference may include generation of a transmission event with respect to a sub-frame, a radio frame, and the signal.

The location of the resource element in which the signal is received may be changed according to a time index determined depending on change of a time based on the specific reference.

The preset hopping pattern may be determined differently by small-scaled cells or clusters.

Further, the preset hopping pattern may be configured by a macro cell.

Moreover, the preset hopping pattern may be determined by at least one of a cell ID corresponding to the optional small-scaled cell, a cluster ID corresponding to a cluster included in the optional small-scaled cell, and the time index.

The signal may have a form identical or similar to one of a CSI-RS (Channel-State Information Reference Signal), a CRS (Cell-specific Reference Signal), and a PRS (Positioning Reference Signal).

When the signal has the form identical or similar to the CSI-RS, the signal is transmitted on a resource element corresponding to a CSI-RS configuration corresponding to the signal, and the CSI-RS configuration corresponding to the signal may be changed according to a time.

When the signal has the form identical or similar to the CSI-RS, the signal is transmitted on a location of a resource element moving a location of a resource element corresponding to the CRS with a specific pattern, and the specific pattern may be changed according to a time.

When the signal has the form identical or similar to the PRS, the signal is transmitted on a location of a resource element moving a location of a resource element corresponding to the PRS with a specific pattern, and the specific pattern may be changed according to a time.

In addition, the other disclosures of the present invention provide a method of searching a cell capable of reducing interference of a discovery signal between small cells (or small-scaled cells) in a small cell cluster (or cluster) or between the small cell clusters.

A method of searching a cell according to other disclosures of the present invention finds an optional small-scaled cell of a wireless communication system including a plurality of small cell clusters having a plurality of small cells. The method includes: receiving a discovery signal generated by the optional small-scaled cell and searching the optional small-scaled cell based on the discovery signal. The location of the resource element to which the discovery signal is transmitted may be changed according to a time.

A terminal or UE according to other disclosures of the present invention finds an optional small-scaled cell of a wireless communication system including a plurality of small cell clusters having a plurality of small cells. The terminal or UE includes: an RF unit to receive a discovery signal generated by the optional small-scaled cell and a processor to search the optional small-scaled cell based on the discovery signal. The location of the resource element to which the discovery signal is transmitted may be changed according to a time.

Hereinafter, other disclosures of the present invention will be described with reference to the accompanying drawings.

In detail, a second disclosure of the present invention suggests a method of reducing interference of a discovery signal between small cells in a small cell cluster. A third disclosure of the present invention suggests a method capable of reducing interference of a discovery signal between small cell clusters.

II. Second Disclosure of the Present Invention

A described above, the second disclosure of the present invention suggests a method of reducing interference of a discovery signal between small cells when the discovery signal is transmitted in a small cell environment.

If adjacent small cells transmit a discovery signal in the same resource element location of the same sub-frame, the discovery signal transmitted from other cells is operated due to interference of a discovery signal being a reception target.

Accordingly, the UE may detect or sense a small cell for service of the UE or may exactly detect or sense many small cells close to the UE.

In order to prevent this, a method of using an orthogonal discovery signal between small cells located in the same cell cluster.

One method of satisfying orthogonality is to prevent resource element locations of a discovery signal transmitted between cells from overlapping with each other.

When a form of the discovery signal is identical or similar to a form of CSI-RS, CRS, PRS, a following method is used in order to satisfy orthogonality of a discovery signal between cells.

Orthogonality scheme when a forms of a discovery signal is a form of a CSI-RS

A resource element location of CSI-RS corresponding to a different CSI-RS configuration may be used in order to transmit a discovery signal between small cells in the same small cell cluster.

A CSI-RS having different CSI-RS configurations is configured as different resource element locations.

If the discovery signal is transmitted using a resource element location of different CSI-RS configurations between small cells, transmission resource element locations of a discovery signal between the small cell are not overlapped with each other.

In this case, CSI-RS configuration for configuring a transmission resource element location of the discovery signal may be the same as or be independent from the CSI-RS configuration used to indicate a CSI-RS transmitted from a corresponding real small cell.

In the second disclosure of the present invention, when the discovery has a form of the CSI-RS, a CSI-RS configuration for configuring a transmission resource element location of the discovery signal refers to DS CSI-RS configuration.

Orthogonality scheme when a form of the discovery signal is a form of a CRS

In order to transmit the discovery signal, a RE location obtained by v-shifting and/or symbol-shifting a resource element location of CRS (port 0) and a corresponding resource element location may be used.

The v-shift (or v-shift) may mean change of the resource element location based on the v-shift value (with reference to vshift of equation 5).

In this case, in order to transmit a discovery signal between small cells located in the same small cell cluster, the transmission resource element locations of the discovery signal may not be overlapped with each other by using different v-shift values and/or symbol-shift values.

Orthogonality scheme when a form of the discovery signal is a form of a PRS

In order to transmit the discovery signal, a RE location obtained by v-shifting and/or symbol-shifting a resource element location of PRS (port 6) and a corresponding resource element location may be used.

The v-shift (or v-shift) may signify change of a resource element location based on the v-shift value (with respect to vshift of equation 10).

In order to transmit a discovery signal between small cells located in the same small cell cluster, a resource element location transmitting the discovery signal may not be overlapped with each other by using the different v-shift values and/or symbol-shift values.

Orthogonality scheme when a form of the discovery signal is a form of PSS/SSS

Interference may be prevented through a TDM between small cells in the same scheme as OFDM symbol shift.

The above schemes are illustrative purpose and a technology described in the present invention may be used to generate a sequence of other RS based discovery signal and to designate a RS location.

III. Third Disclosure of the Present Invention

The second disclosure of the present invention suggests a scheme capable of reducing interference of a discovery signal by differently positioning a resource element location of the discovery signal in the small cell cluster.

However, the interference between small cell clusters may be considered in a state that different small cell clusters are close to each other.

Accordingly, a third disclosure among disclosures of the present invention suggests a scheme capable of reducing interference of a discovery signal between small cell clusters when the discovery signal is transmitted in a small cell environment.

Figure 15:
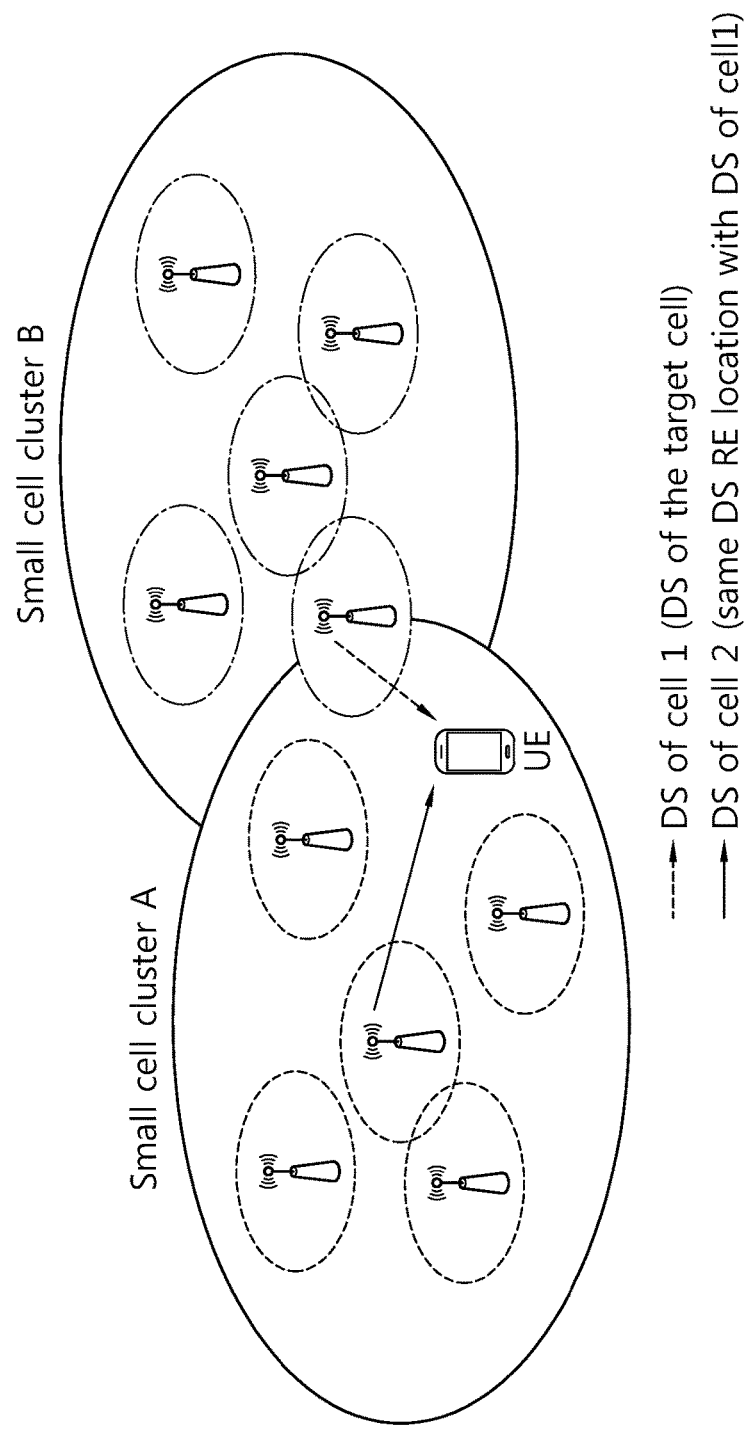
FIG. 15 is an exemplary diagram illustrating an interference problem between small cell clusters.

FIG. 15 is an exemplary diagram illustrating an interference problem between small cell clusters.

Referring to FIG. 15, different small cell clusters may be close to each other in a small cell environment.

For example, as shown in FIG. 15, when a small cell cluster A is close to a small cell cluster B, and the small cell clusters have the same carrier frequency, a specific call in the small cell cluster A and a specific cell in the small cell cluster B may generate the discovery signal using the same resource element location.

In this case, the discovery signal in a different small cell cluster may be interfered.

That is, as shown in FIG. 15, a cell 1 in the small cell cluster A and a cell 2 in the small cell cluster B transmit the same transmission resource element location of the discovery signal, if the UE receives the discovery signal of the cell 1, the discovery signal transmitted from the cell 2 serves as interference when the UE receives the discovery signal of the cell 1.

The third disclosure of the present invention suggests a scheme for reducing the interference due to a discovery signal transmitted from different small cell clusters.

Further, when a great number of small cells are included in the same cluster, the small cells cannot be allocated without overlapping a resource. For example, when the cell ID is associated with resource allocation, although a time is changed, the overlapped cells may maintain the overlapped state.

Accordingly, randomization with respect to distribution of resources to which the discovery signal is transmitted is required in resource allocation in a small cell cluster or between clusters.

Further, when a great number of small cells are included in the cluster, orthogonal assignment of the resource may be achieved by sub-dividing the cluster into sub-clusters.

A cell ID described in the disclosures of the present invention may mean a real cell ID of each cell, but may means a virtual cell ID configured by a network.

Accordingly, a cell ID described in the third disclosure of the present invention is a wide concept to include application of a virtual cell ID.

Hereinafter, an interference prevention and avoidance scheme with respect to a discovery signal according to the third disclosure of the present invention will be described with reference to the accompanying drawings.

In detail, a first aspect of the third disclosure of the present invention describes an interference avoidance scheme between small cell clusters through a DS offset adjustment. A second aspect of the second disclosure of the present invention describes an interference randomization scheme by hopping a discovery signal.

1. First aspect of the third disclosure of the present invention: interference avoidance scheme between small cell clusters The first aspect of the third disclosure of the present invention suggests a method of allowing different small cell clusters to which the discovery signal is transmitted to have different temporal domains (for example, sub-frame/radio frame domain) and/or frequency domains in order to prevent small cells in different small cell clusters from being interfered with each other because the small cells have the same transmission location of the discovery signal.

To this end, the first aspect of the third disclosure of the present invention suggests that adjacent small cell clusters have different DS offset values which are an offset value of a sub-frame/radio frame to which the discovery signal is transmitted.

For example, when the discovery signal is transmitted during four sub-frames (for example, DS duration=4 msec), DS offset in small cells in the small cell cluster A may be 0 msec and DS offset in small cells in the small cell cluster B may be 4 msec.

In this case, small cells in the small cell cluster A transmit the discovery signal during sub-frames #0~#3, and small cells in the small cell cluster B transmit the discovery signal during sub-frames #4~#7.

An ID of the cluster may exist every small cell cluster, and the ID of the small cell cluster may refer to a cluster id.

The first aspect of the third disclosure of the present invention suggests that the DS offset value is changed according to an ID of the small cell cluster.

That is, the DS offset value may be changed according to the cluster id. In this case, the DS offset value of each small cell cluster may characteristically indicate (DS duration× cluster id) mod (DS period).

FIG. 16 is an exemplary diagram illustrating an interference avoiding scheme according to a first aspect of a third disclosure of the present invention.

Referring to FIG. 16, when there are different small cell clusters, small cells included in each small cell cluster may confirm an example of transmitting the discovery signal not to be overlapped with each other.

In accordance with the interference avoidance scheme according to a first aspect of the third disclosure of the present invention, the terminal may induce a cluster ID according to detection timing of the discovery signal.

For example, a maximum number of cluster IDs is 10, and a DS offset value is 10, the DS offset is mapped to the cluster ID in one-to-one correspondence. In this case, detection timing of the discovery signal is integrated as a cluster ID so that the cluster ID may be transmitted together with the cell ID upon performing a report with respect to measurement to an eNodeB by the UE. Alternatively, (since the detection timing may not be associated with the cluster ID), the UE may transmit information on the detection timing of the discovery signal to the eNodeB.

An offset applying scheme according to the first aspect may be used in time/frequency/code sides.

This is applicable to a technology where the terminal blindly read the cluster ID or a group ID while receiving the discovery signal.

When a discovery signal of a small cell not the cluster ID is determined according to timing of an overlaid macro cell, information on when the discovery signal is detected may be used to detect an overlaid macro cell of a searched or discovered small cell.

A scrambling ID of the discovery signal maintains a cell ID range [0-503], but may be used to indicate more IDs.

In other words, an ID to which the discovery signal is transmitted may be estimated by using an ID used to scramble the discovery signal and an ID from UE blinding decoding (BD), for example, BD timing and frequency. The ID may be used when the above information is reported to the serving cell.

Such a method is applicable to a case where the discovery signal is v-shifted/symbol-shifted from a specific location or is transmitted through different frequency domains according to a cluster ID.

The terminal may induce the cluster ID through the v-shift value/symbol-shift value detecting the discovery signal or a frequency domain. When the UE performs report with respect to measurement to the eNodeB, the UE may transmit a corresponding cluster ID together with a cell ID.

Alternatively, since the v-shift value/symbol-shift value or the frequency domain may not be associated with the cluster ID, the UE may transmit the v-shift value/symbol-shift value detecting the discovery signal or the frequency domain to the eNodeB.

In another case, when the terminal is located between two small cell clusters and an overlaid macro cell or a controlling eNodeB for controlling each cluster is different, each macro cell may provide only information on a corresponding cluster.

For example, when a base station 1 eNodeB 1 or cluster 1 reports that a discovery signal with respect to a cell 1 from f1, and a base station 2 eNodeB2 or a cluster 2 reports that a discovery signal with respect to a cell 1 from f2, if the cell is detected from the f1, the base station 2 report it to the base station 1. When the cell 1 is detected from f2, the base station 1 may report the detected cell 1 to the base station 2.

In other words, only a detection result based on information transmitted from each base station may be considered to be transmitted to each base station.

2. Second aspect of third disclosure of the present invention: Interference avoidance and interference randomization scheme between small cell clusters The second aspect of the third disclosure of the present invention changes a resource element location of the discovery signal used in one small cell according to a time, and changes a pattern in which a resource element location of the discovery signal is changed every a small cell or every small cell cluster to which the small cell belongs in order to prevent the discovery signals between small cells in different small cell clusters from interfering with each other because transmission location of the discovery signal between small cells in different small cell clusters are the same.

That is, a method of searching a cell according to a second aspect of the third disclosure of the present invention searches a specific small cell from a wireless communication system including a plurality of small cell clusters having a plurality of small cells. The method includes receiving a discovery signal generated from the specific small cell and searching the specific small cell based on the discovery signal. The location of a resource element to which the discovery signal is transmitted is changed according to a time.

In addition, the location of a resource element to which the discovery signal is transmitted is changed according to a specific hopping pattern. The specific pattern may be determined differently by small cells and by clusters.

The discovery signal may have a form identical or similar to a form of one of a CSI-RS (Channel-State Information Reference Signal), a CRS (Cell-specific Reference Signal) and a PRS (Positioning Reference Signal)

If the discovery signal has a form identical or similar to a form of the CSI-RS, the discovery signal is transmitted on a resource element corresponding to CSI-RS configuration corresponding to the discovery signal. The CSI-RS corresponding to the discovery signal may be changed according to the time.

If the discovery signal has a form identical or similar to a form of the CRS, the discovery signal is transmitted on a location of a resource element moving a location of a resource element corresponding to the CRS to a specific pattern. The specific pattern may be changed according to the time.

Moreover, if the discovery signal has a form identical or similar to a form of the PRS, the discovery signal is transmitted on a location of a resource element moving a location of a resource element corresponding to the CRS to a specific pattern. The specific pattern may be changed according to the time.

Accordingly, a resource element area to which a discovery signal of another small cell interfering with a specific small cell is transmitted may be changed according to the time.

In addition, a resource element location to which discovery signals of two small cells are transmitted is continuously the same to prevent a continuous interference phenomenon.

Figure 17A:
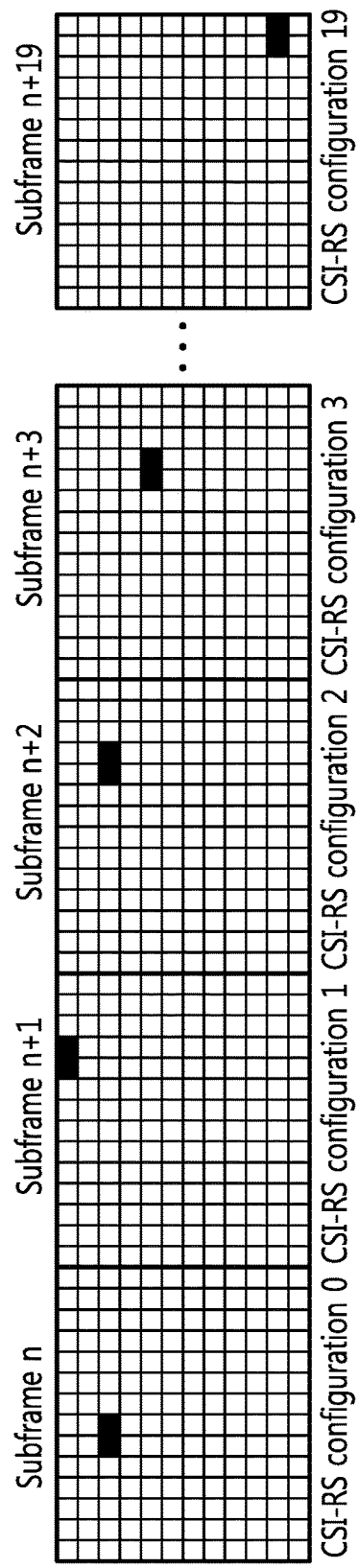
FIG. 17A and FIG. 17B are exemplary diagrams illustrating interference randomization according to a second aspect of a third disclosure of the present invention.
Figure 17B:
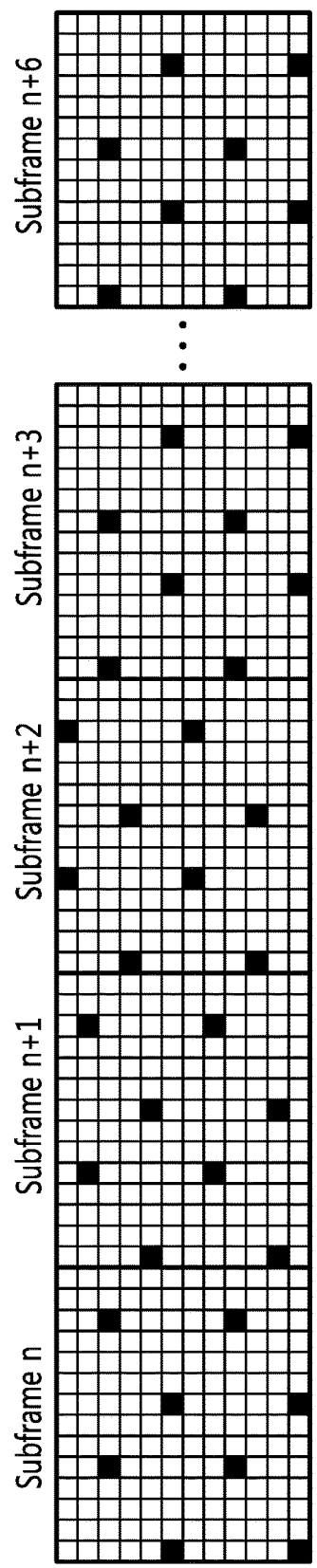

FIG. 17A and FIG. 17B are exemplary diagrams illustrating interference randomization according to a second aspect of a third disclosure of the present invention.

As shown in FIG. 17A and FIG. 17B, a resouce element location of the discovery signal used in the small cell may be changed according to the time. Accordingly, interference randomization with respect to the discovery signal is possible.

According to a second aspect of the third disclosure of the present invention, a change period (time unit) of a resource element location of the discovery signal may be as follows.

Change by Sub-Frames

The resource element location of the discovery signal in the specific small cell may be changed. Alternatively, the resource element location of the discovery signal in the specific small cell may be changed by multiple sub-frames.

In this case, a period of the sub-frame in which the resource element location of the discovery signal is changed may be fix or configured through (for example, 1 sub-frame) RRC signaling.

Change by Radio Frames

The resource element location of a discovery signal in a specific small cell may be changed by radio frames.

That is, a resource element location of a different discovery signal may be used by SFNs (system frame numbers). Alternatively, the resource element location of the discovery signal in a specific small cell may be changed by multiple radio frames.

In this case, a period of the sub-frame in which the resource element location of the discovery signal is changed may be fix or configured through (for example, 1 sub-frame) RRC signaling.

Change by DS Bundles

The resource element location in the specific small cell may be changed by bundles of discovery signals transmitted during a DS duration (transmission changes of the discovery signal or by generations of a transmission event with respect to the discovery signal.

FIG. 18 is an exemplary diagram illustrating a resource element location of a discovery signal changed by bundles of the discovery signal.

As shown in FIG. 18, when a DS duration when the discovery signal is transmitted once is 4 msec, the discovery signal is transmitted to the same RE location for a DS duration (4 msec) to which the discovery signal is transmitted once.

However, a resource element location to which the discovery signal is transmitted may be changed between discovery signals which are transmitted during a DS duration (4 msec).

For example, as shown in FIG. 18, if the resource element location of the discovery signal transmitted during a DS duration at a specific time point is DS RE location 0, the resource element location of a discovery signal transmitted during a DS duration at next time (at the time of next DS transmission or next DS transmission event generation) may be DS RE location 1.

That is, according to the second aspect of the third disclosure of the present invention, the location of the resource element to which the discovery signal is transmitted may be changed according to a time based on a specific reference.

In this case, the specific reference may include a sub-frame, a radio frame, and generation of a transmission event with respect to and the discovery signal.

That is, as described above, the location of the resource element to which the discovery signal is transmitted may be changed according to the time by sub-frames, radio frames, or DS bundles (or generations of the transmission event with respect to the discovery signal) which is the specific reference.

Meanwhile, a form of the discovery signal is the same as a form of CSI-RS, CRS, and PRS, a resource element location of the discovery signal may be changed according to the time as follows.

When the form of the discovery signal is the same as that of CSI-RS

The discovery signal may be transmitted using a resource element location of a different DS CSI-RS configuration according to the time.

That is, as shown in FIG. 17B, the discovery signal may be transmitted through a resource element location corresponding to CSI-RS configuration with respect to a different discovery signal in a sub-frame unit or by transmission changes of the discovery signal (or by transmission events of the discovery signal).

When the form of the discovery signal is the same as a form of the CRS or a form of v-shifting and/or symbol-shifting the CRS The discovery signal may be transmitted using a different resource element location according to the time by applying a different v-shift and/or symbol-shift according to the time to the discovery signal.

That is, as shown in FIG. 17A, the discovery signal may be transmitted through a resource element location applying a different v-shift in a sub-frame unit.

When the form of the discovery signal is the same as a form of v-shifting and/or symbol-shifting the PRS or the PRS The discovery signal may be transmitted through a different resource element location according to a time by applying a different v-shift and/or a different symbol-shift according to the time to the discovery signal.

Meanwhile, in order to prevent a continuous interference phenomenon because the resource element location to which a discovery signal between two small cells included in different small cell clusters is continuously the same, a changed pattern of the resource element location of the discovery signal may be changed every cell and/or every small cell cluster.

Hereinafter, a changed pattern of the resource element location of the discovery signal refers to a hopping pattern.

That is, according to the third aspect of the third disclosure of the present invention, the resource element location to which the discovery signal is transmitted may be changed according to a specific hopping pattern. The specific hopping pattern may be changed by small cells or small cell clusters.

The second aspect of the third disclosure of the present invention suggests to determine configuration of the resource element location of the discovery signal and the changed pattern (or hopping pattern) by following schemes.

First Scheme

According to the first scheme, the UE may configure a transmission resource element location of the discovery signal in the specific small cell from a specific cell.

For example, the macro cell may send assistance information on the discovery signal with respect to all small cells in one small cell clusters, for example, configuration, offset, periodicity, and cell ID. That is, the specific hopping pattern may be configured by the macro cell.

Further, for example, the discovery signal of the specific small cell has the form of the CRS/PRS, the resource element location of the discovery signal may indicate a v-shift value and/or a symbol-shift value in a resource element location of CRS port 0/PRS port 6.

In this case, the UE may configure the v-shift value and/or the symbol-shift value from the specific cell.

As the another example, when the discovery signal of the specific small cell has a form of the CSI-RS, the resource element location of the discovery signal may be changed according to DS CSI-RS configuration In this case, the UE may configure a value of the DS CSI-RS configuration from the specific cell.

Further, according to the first scheme, the UE may acquire the transmission resource element location of the discovery signal in the specific small cell from a cell ID of a corresponding cell and/or an ID (cluster id) of a small cell cluster included in a corresponding cell.

That is, the transmission resource element location of the discovery signal may represent as a function of the cell id and/or the cluster id For example, when the discovery signal of the specific small cell has a form of CRS/PRS, the resource element location of the discovery signal may represent as a v-shift value and/or a symbol-shift value in a resource element location of the CRS port 0/PRS port 6. In this case, the UE may acquire a v-shift value and/or a symbol-shift value from the cell id and/or the cluster id (that is, may represent the v-shift value and/or the symbol-shift value as a function of the cell id and/or the cluster id).

As another example, a discovery signal of the specific small cell has a form of CSI-RS, the resource element location of the discovery signal may be changed according to DS CSI-RS configuration.

In this case, the UE may acquire the DS CSI-RS configuration index from the cell id and/or the cluster id (that is, may represent the DS CSI-RS configuration value as a function of the cell id and/or the cluster id).

For example, the DS CSI-RS configuration index may be configured as (cell ID mod M) or (cell ID+cluster id) mod M, where M is the number of DS CSI-RS configurations.

In the disclosures of the present invention, as described above, an index (for example, v-shift/symbol-shift value, and/or DS CSI-RS configuration index) configured from a specific other cell or acquires from a cell ID of a corresponding small cell and/or a cluster ID from the small cell cluster to which a corresponding small cell belongs to represent a resource element location of the discovery signal refers to DS_idx.

Further, according to the first scheme, the resource element location to which the discovery signal is transmitted may be changed by indexes of the time unit in which a resource element of the discovery signal is changed (by sub-frames, by radio frames, or DS bundles which is the above specific reference).

In the disclosures of the present invention, a time index of a time unit in which the resource element location of the discovery signal is changed refers to t_idx.

In other words, the resource element location to which the discovery signal is transmitted may be changed according to a time index t_idx which is determined according to variation in the time based on the specific reference.

In this case, a pattern (or hopping pattern) in which the resource element location to which the discovery signal is transmitted is changed according to the time (or t_idx) may be changed according to the cell id and/or the cluster id.

That is, the pattern in which the resource element location is changed according to the time may represent as a function of the cell id and/or the cluster id.

When there an index DS_idx with respect to resource element location information on the discovery signal in the specific small cell, the resource element location of the discovery signal (for example, v-shift/symbol-shift value, and/or DS CSI-RS configuration index) in a specific time point in a corresponding small cell may be changed according to a cell ID of a corresponding small cell and/or an ID (cluster id) of a small cell cluster including a corresponding small cell.

For example, when a discovery signal having a form of the CSI-RS is transmitted using a resource element location of a different DS CSI-RS configuration according to t_idx, and the discovery signal in a specific t_idx is transmitted through DS CSI-RS configuration DS_idx(t_idx), DS_idx (t_idx)=(DS_idx×cell id×cluster id×t_idx) mod M, where M=the number of DS CSI-RS configurations or DS_idx (t_idx)=(DS_idx×cluster id×t_idx) mod M, where M=the number of DS CSI-RS configurations.

The n may characteristically be a sub-frame index/SFN of the macro cell to provide assistance information.

As another example, when the discovery signal having a form of CSI-RS is transmitted using a resource element location of a different DS CSI-RS configuration according to the t_idx, and a discovery signal in a specific t_idx is transmitted through DS CSI-RS configuration DS_idx (t_idx), DS_idx(t_idx)=c(t_idx) mod M, where M=the number of DS CSI-RS configurations.

In this case, the c(t_idx) may represent a pseudo-random sequence. The pseudo-random sequence may be a sequence which is initialized according to the DS_idx, the cell id and/or the cluster id.

As another example, the discovery signal having a form of CSI-RS is transmitted using a resource element location of a different DS CSI-RS configuration according to t_idx, and the discovery signal in a specific t_idx is transmitted through a DS CSI-RS configuration DS_idx(t_idx), DS_idx (t_idx)=(DS_idx(t_idx-1)×(cluster_id×t_idx)) mod M, where DS_idx(−1)=DS_idx, and M=the number of DS CSI-RS configurations.

The n may characteristically represent a sub-frame index/SFN to provide assistance information.

As another example, when a discovery signal having a form of the CSI-RS is transmitted using a resource element location of a different DS CSI-RS configuration according to the sub-frame, and a discovery signal in a specific sub-frame index n is transmitted through DS CSI-RS configuration DS_idx(n), DS_idx(n)=(DS_idx(n−1)×(cluster id×n)) mod M, where DS_idx(−1)=DS_idx, and M=the number of DS CSI-RS configurations.

The n may include a sub-frame (or SCG sPCell, sub-frame index of a specific Scell) to provide assistance information.

Second Scheme

The transmission resource element location of the discovery signal according to the time t_idx may be determined according to the cell id and/or the cluster id and the t_idx.

That is, the resource element location to which the discovery signal is transmitted may be represented as a function of the cell id and/or the cluster id and the t_idx.

For example, when the discovery signal having a form of CSI-RS is transmitted using a resource element location of a different DS CSI-RS configuration according to the t_id, and a discovery signal in a specific t_idx is transmitted through a DS CSI-RS configuration DS_idx(t_idx), DS_idx (t_idx)=(cell id×cluster id×t_idx) mod M, where M=the number of DS CSI-RS configurations.

The n may characteristically represent sub-frame index/ SFN of a macro cell to provide assistance information.

As another example, when the discovery signal having a form of CSI-RS is transmitted using a resource element location of a different DS CSI-RS configuration according to the t_idx, and a discovery signal in a specific t_idx is transmitted through DS CSI-RS configuration DS_idx (t_idx), DS_idx(t_idx)=c(t_idx) mod M, where M=the number of DS CSI-RS configurations.

In this case, the c(t_idx) represents a pseudo-random sequence, and the pseudo-random sequence may be a sequence initialized according to the cell id and/or the cluster id.

As another example, the discovery signal having a form of C CSI-RS is transmitted using a resource element location of a different DS CSI-RS configuration according to the t_idx, and the discovery signal in a specific t_idx is transmitted through DS CSI-RS configuration DS_idx(t_idx), DS_idx(t_idx)=(DS_idx(t_idx-1)×(cluster id×t_idx)) mod M, where DS_idx(-1)=cell ID and M=the number of DS CSI-RS, or DS_idx(t_idx)=(DS_idx(t_idx-1)×(cell id×t_idx)) mod M, where DS_idx(-1)=cluster ID and M=the number of DS CSI-RS.

The n may be a sub-frame index/SFN of a macro cell to provide assistance information.

As a concrete example, a discovery signal having a form of CSI-RS is transmitted using a resource element location of a different DS CSI-RS configuration according to a sub-frame, and the discovery signal in the specific sub-frame index n is transmitted through a DS CSI-RS configuration DS_idx(n), DS_idx(n)=(DS_idx(n-1)×(cluster id×n)) mod M, where DS_idx(-1)=cell id, and M=the number of DS CSI-RS configurations, or DS_idx(n)=(DS_idx(n-1)×(cell id×n)) mod M, where DS_idx(-1)=cluster id, and M=the number of DS CSI-RS configurations.

The n may be a sub-frame index of a macro cell (or SCG sPCell, sub-frame index, sub-frame index of a specific Scell) to provide assistance information.

Third Scheme

As descried in the first scheme, the UE may configure a transmission resource element location of a discovery signal in the specific small cell from a specific cell or may obtain the transmission resource element location of a discovery signal from the cell id and/or cluster id.

For example, when the discovery signal of a specific small cell has a form of CRS/PRS, a resource element location of the discovery signal may be presented as the v-shift value and/or the symbol-shift. The UE may configure the v-shift value and/or the symbol-shift value from a specific cell or may acquire the v-shift value and/or the symbol-shift value from the cell id and/or the cluster id As another example, when the discovery signal of a specific small cell has a form of CSI-RS, the RE location of the discovery signal may be changed according to DS CSI-RS configuration.

In this case, for example, the UE may configure a DS CSI-RS configuration value from the specific cell or may acquire the DS CSI-RS configuration value from the cell id and/or the cluster id.

In the disclosures of the present invention, an index (for example, v-shift/symbol-shift value, and/or a DS CSI-RS configuration index) capable of indicating a obtainable resource element location of the discovery signal by the above method refers to DS_idx.

In this case, the resource element location of the discovery signal corresponding to a specific DS_idx may be a function of the cell id and/or the cluster id and t_idx (for example, sub-frame index, SFN).

That is, for example, in a case of a discovery signal having a form of CSI-RS, according to a 3GPP TS 36.211 standard document, a resource element location to which a corresponding signal is transmitted may be expressed by the above equation 7.

In this case, indexes k and l indicating a resource element location of a signal may be a function of the cell id and/or the cluster id and the t_idx (for example, sub-frame index, SFN).

For example, k=(cell id×cluster id×t_idx×k')mod 11+12m+alpha, where alpha depends on the antenna port, l=(cell id×cluster id×t_idx×l')mod(7 or 14)+(1" or 21").

As another example, k=(cluster id×t_idx×k')mod 11+12m+alpha, where alpha depends on the antenna port, l=(cluster id×t_idx×l')mod(7 or 14)+(1" or 21").

In a more detailed example, when the resource element location of the discovery signal having a form of CSI-RS according to the sub-frame, and the sub-frame index is n, k=(cell id×cluster id×n×k')mod 11+12m+alpha, where alpha depends on the antenna port, l=(cell id×cluster id×n×l')mod(7 or 14)+(1" or 21"). Alternatively, k=(cluster id×n× k')mod 11+12m+alpha, where alpha depends on the antenna port, l=(cluster id×n×l')mod(7 or 14)+(1" or 21").

Therefore, according to a second aspect of the third disclosure of the present invention, the hopping pattern (or the specific hopping pattern) may be determined by at least one of an identification (ID), a cluster ID corresponding to a specific small cell cluster, and the time index.

The discovery signal may be designed to reduce interference between discovery signals.

To this end, the discovery signal may include a resource element location in the sub-frame (for example, a RS resource and a hopping pattern of a multiple sub-frame unit.

In this case, the RS resource may have a form of additionally v-shifting and/or symbol-shifting a basic resource element location.

When the number of different RS resources is N_R, the different RS resources include different resource element locations to have an orthogonal structure.

The hopping pattern may be a frequency hopping in which a frequency location of the discovery signal is changed in a (multiple) sub-frame unit. Alternatively, the hopping pattern may have a hopping form where a resource element location (or RS resource) to which the discovery signal is transmitted is changed in a (multiple) sub-frame unit. In this case, the number of different hopping patterns refers to N_H.

Meanwhile, for the purpose of convenience, the CSI-RS configuration index refers to CSI-RS_idx. In this case, the third disclosure of the present invention suggests that the CSI-RS_idx represents f(init_idx, t_idx)(function of init_idx and t_idx).

In this case, the t_idx may be as follows.

Timing index and time index (for example, sub-frame index, SFN) of a cell transmitting a discovery signal Timing index of PCell, serving cell, SCG sPCell of UE (for example, sub-frame index, SFN)

Timing index of a cell to transmit assistant information and discovery signal configuration to UE (for example, sub-frame index, SFN)

In this case, the init idx may be as follows.

The init_idx determining CSI-RS_idx of DRS-CSI-RS in a specific TP may be determined according to a CSI-RS scrambling ID of a corresponding TP. The init_idx may characteristically be the same as a CSI-RS scrambling ID. Alternatively, one or a plurality of init_idx values may be characteristically and previously defined or configured according to the CSI-RS scrambling ID.

The init_idx determining the CSI-RS idx of a DRS-CSI-RS in the specific TP may be determined according to (NID(1) and/or NID(2)) of a corresponding TP. Characteristically, the init_idx $\stackrel{L}{=}$ PCID may be the same as the PCID value. Alternatively, one or a plurality of init idx values according to (NID(1) and/or NID(2)) may be characteristically and previously defined or configured.

A DS ID of each discovery signal or a RS resource index and/or a hopping pattern index may depend on or be independent from a cell ID of a cell to transmit a corresponding discovery signal.

When the DS ID depends on the cell ID, the DS ID may means a cell ID or a virtual cell ID. Alternatively, a RS resource index of the discovery signal may match with an ID of a cell to transmit a corresponding discovery signal or a virtual cell ID.

Meanwhile, when an index of the discovery signal is a DS ID, a RS resource with respect to the specific DS ID and a configuration scheme with respect to the hopping pattern are as follows.

First Configuration Scheme

According to the first configuration scheme, if the DS ID is known, the user may know a RS resource and a hopping pattern of the discovery signal having a corresponding DS ID.

In this case, there may be discovery signals having the RS resource but having different hopping patterns.

In this case, the discovery signals having the same RS resource but having different hopping patterns include different DS IDs. In this case, the number of DS IDs may be the same as N_R*N_H.

If the DS ID of the specific discovery signal is known, a RS resource of a corresponding discovery signal and an index of a hopping pattern may be defined as follows.

First, an index of the hopping pattern of the specific DS ID may be the same as a DS ID mod N_H and an index of the RS resource is the same as floor (DS ID/N_H).

Alternatively, the index of the hopping pattern of the specific DS ID may be the same as floor (DS ID/N_R) and an index of the RS resource may be the same as DS ID mod N_R.

Second Scheme

According to the second configuration scheme, if the DS ID is known, the user may know a RS resource and a hopping pattern of the discovery signal having a corresponding DS ID.

In this case, one RS resource may include only one hopping pattern.

That is, there are no discovery signals including different DS IDs include different RS resources. defined as follows.ry signal or a virtual cell ID.65g the same RS resource and different hopping patterns.

In this case, a discovery signal including different RS resources include different DS IDs. The discovery signals having different DS IDs include different RS resources. In this case, the number of the DS IDs may be the same as N_R.

If the DS ID of the specific discovery signal is known, a RS resource of the corresponding discovery signal and an index of the hopping pattern may be determined as follows.

An index of the RS resource of the specific DS ID may be the same as the DS ID. An index of the hopping pattern of the specific DS ID may be the same as floor (DS ID/N_R) or DS ID mod N_H.

Third Configuration Scheme

According to the third configuration scheme, if the DS ID is known, the user may know a RS resource of the discovery signal having a corresponding DS ID.

In this case, characteristically, the discovery signals having different RS resources may include different DS IDs.

In addition, characteristically, the discovery signals having different RS resources may include different RS resources.

In this case, an index of the RS resource of the DS ID may be the same as the DS ID or the DS ID mod N_R.

In this case, the user may not know a hopping pattern applied to a corresponding discovery signal by only a DS ID of the discovery signal.

Accordingly, the eNodeB reports a discovery signal to be detected to the UE, the eNodeB may report a DS ID or a hopping pattern of a DS ID group in which a corresponding discovery signal is included together with a DS ID of the discovery signal to the UE.

Alternatively, when the eNodeB reports only a DS ID with respect to a discovery signal to be detected to the UE, the UE detects a discovery signal having a corresponding DS ID by performing blind decoding with respect to possible hopping patterns. The UE may report the additionally detected hopping pattern to the eNodeB together with the detected DS ID.

Meanwhile, a case of transmitting a discovery signal used in each cell having different transmission powers may be considered.

In this case, the power may be reported through the discovery signal or network assistance.

However, in a case of transmitting the discovery signal with high power, since the discovery signal may relatively interfere with other discovery signals much, there is a need not to overlap a resource between the discovery signal transmitted with the high power and a discovery signal transmitted with low power.

Accordingly, possible resources for the discovery signal may be configured so that cross-levels are not overlapped with each other by dividing the possible resources in a power level unit.

This provides a different resource configuration (for example, CSI-RS resource configuration indices or CRS V-shift value) and the hopping pattern is equally applied to each level or a usable configuration may be used by hopping a resource to have a predetermined pattern.

In a case of a cell having great power, since the cell may be aimed at increasing coverage, the cell detection with respect thereto needs to assist a terminal to receive a discovery signal with low SINR.

To this end, rather than increasing transmission power per each resource element, density of the discovery signal may be increased as compare with other cells upon transmission of the discovery signal. The disclosures of the present invention are applicable to the above case.

<Additional Disclosure of the Present Invention>

The additional disclosure of the present invention suggests a DRS-CSI-RS transmission timing configuration scheme.

DMTC (DRS measurement timing configuration) information for RSRP/RSRQ measurement may be transmitted to the terminal through RRC signaling. Characteristics of the above configuration are as follows.

(UE can be configured with at least one DRS measurement timing configuration (DMTC) per frequency)

Note: DRS measurement timing configuration indicates when UE may perform cell detection and RRM measurement based on DRS Note: UE can detect multiple cells based on a DRS measurement timing configuration on the frequency UE can expect DRS in DRS measurement timing configuration DRS measurement timing configuration includes at least period and offset and potentially duration. The reference timing for the offset is the primary serving cell's timing A start point of a "measurement window" may be indicated by the above period and offset so that a DRS measurement with respect to a corresponding frequency is performed.

Such a measurement window periodically appears every period (for example, 40 ms, 80 ms, 160 ms, . . . ).

The terminal deters (multiple) DRS occasion(s) which may exist in the DMTC measurement window and performs DRS-based measurement.

Figure 19:
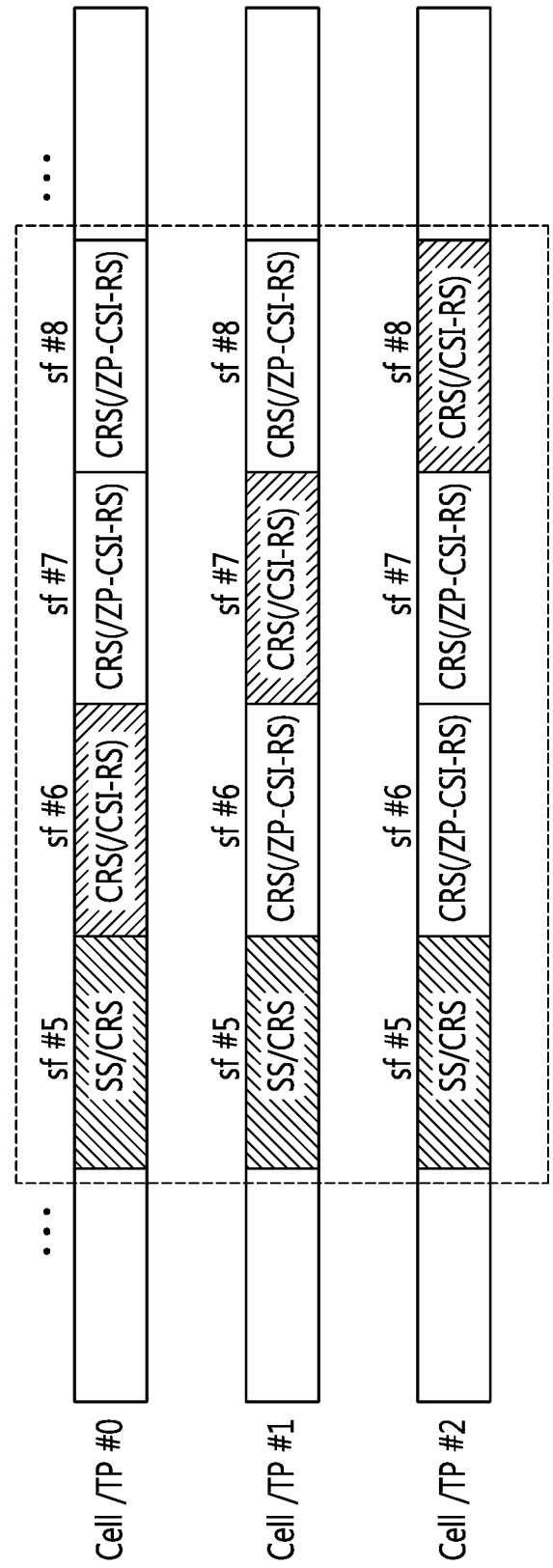
FIG. 19 is an examplary diagram illustrating a location of a transmission sub-frame of CSI-RS (DRS-CSI-RS) included in a DRS.

FIG. 19 is an exemplary diagram illustrating a location of a transmission sub-frame of CSI-RS(DRS-CSI-RS) included in a DRS.

Referring to FIG. 19, a location of a transmission sub-frame of CSI-RS (DRS-CSI-RS) included in the DRS may be changed every cell/TP.

In this case, characteristically, the UE may configure a transmission sub-frame location of a DRS-CSI-RS in each cell/TP.

In this case, the UE may configure a CSI-RS sub-frame offset value as listed in Table 6.10.5.3-1 of TS 36.211 (see table 6) to detect a transmission sub-frame location of DRS-CSI-RS transmitted from each cell/TP.

In this way, in order to configure a CSI-RS sub-frame offset, 1) the UE may apply a period/offset value of CSI-RS according to timing of a PCell of the UE. Alternatively, 2) the UE may assume that timing of each cell/TP is the same as that of a PCell. Alternatively, 3) a network may report timing (sub-frame) offset value with the PCell by cell/TPs or frequencies. In this case, the UE may induce sub-frame timing in each cell/TP or each frequency by applying the configured offset value to PCell timing. It may be assumed that all cell/TPs are synchronized at a corresponding frequency receiving the DRS-CSI-RS configuration at a corresponding frequency when offset by frequencies is given.

As another method of configuring a transmission sub-frame location of DRS-CSI-RS in each cell/TP from the base station, an offset value from a start sub-frame location (start point of measurement window) at a DRS measurement timing configuration (DMTC) interval may be configured.

That is, the UE may configure a relative offset value from a start sub-frame location at a DMTC interval (start point of measurement window) with respect to each cell/TP, and may determine that DRS-CSI-RS of each cell/TP is transmitted at a sub-frame location indicated by corresponding offset.

The corresponding offset value may characteristically have a range of 0 to 4. In this case, a transmission period of the DRS-CSI-RS is the same as a period of the DMTC.

The UE may configure a period of the DRS-CSI-RS separately from a period of the DMTC. However, when the period of the DRS-CSI-RS is not configured, it may be assumed that the period of the DRS-CSI-RS is the same as the period of the DMTC.

As another method of configuring the transmission sub-frame location of DRS-CSI-RS in each cell/TP from the base station by the UE, the UE may configure an offset value from the transmission sub-frame location of an SSS (that is, DRS-SSS) included in the DRS.

That is, the UE may configure a relative offset value from the transmission sub-frame location of a SSS (DRS-SSS) included in a DRS with respect to each cell/TP, and may determine that DRS-CSI-RS of each cell/TP is transmitted at a sub-frame location indicated by corresponding offset.

In this case, the DRS-SSS may be transmitted through the same sub-frame location in all cell/TPs. In another method, the offset value may be an offset value from the transmission sub-frame location of a PSS (that is, DRS-PSS) included in the DRS. Characteristically, a corresponding offset value may have the range of 0 to 4 or −4 to 4.

The configurations may be achieved or designated in the UE by cell/TP, a group of cell/TP or frequencies.

The above embodiment of the present invention may be implemented through various means. For example, the embodiments of the present invention may be implemented by hardware, firmware, software, or a combination thereof. In detail, the embodiments of the present invention will be described with reference to the accompanying drawings.

Figure 20:
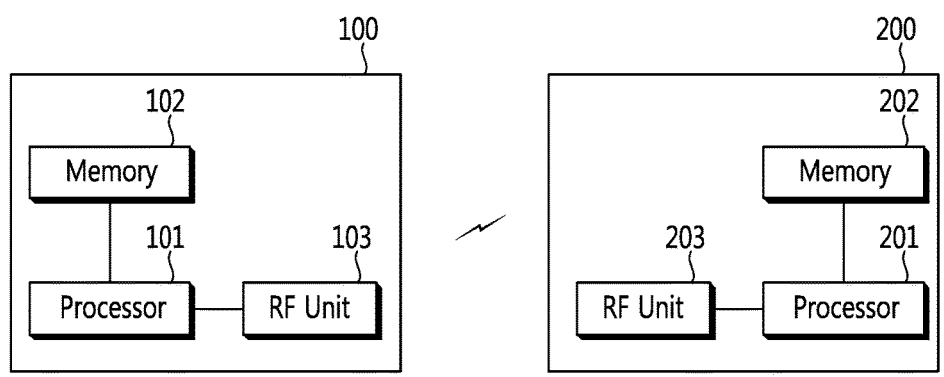
FIG. 20 is a block diagram illustrating a wireless communication system accoding to an embodiment of the present invention.

FIG. 20 is a block diagram illustrating a wireless communication system according to an embodiment of the present invention.

The base station 200 includes a processor 201, a memory 202, a radio frequency (RF) unit 203. The memory 202 is connected to the processor 201, and stores various information for driving the processor 201. The RF unit 203 is connected to the processor 201, and sends and receives radio signals. The processor 201 implements suggested functions, procedures, and/or methods. In the above embodiment, the operation of the base station may be implemented by the processor 201.

The UE 100 includes a processor 101, a memory 102, a radio frequency (RF) unit 103. The memory 102 is connected to the processor 101, and stores various information for driving the processor 101. The RF unit 103 is connected to the processor 101, and sends and receives radio signals. The processor 101 implements suggested functions, procedures, and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

A terminal or UE according to a disclosure of the present invention receives a signal which is transmitted through a plurality of sub-frames upon one transmission from a plurality of small-scaled cells grouped in a cluster unit, has a long period and is periodically transmitted. The terminal or the UE includes an RF unit to receive the signal and a processor which controls the RF unit to receive the signal from an optional small-scaled cell among a plurality of small-scaled cells on a first sub-frame, and to receive the signal from the optional cell on a second sub-frame. A location of a resource element in which the signal is received on the first sub-frame may be different from a location of a resource element in which the signal is received on the second sub-frame by changing the location of the resource element in which the signal is received according to a preset hopping pattern.

Even if the optional small-scaled cell is in an off state, the above signal is received. Signals different from the above signal may not be received in an off state of the optional small scaled cell.

The location of the resource element in which the signal is received may be changed based on a specific reference. The specific reference may include generation of a transmission event with respect to a sub-frame, a radio frame, and the signal.

The preset hopping pattern may be determined differently by small-scaled cells or clusters.

Moreover, the preset hopping pattern may be determined by a cell ID corresponding to the optional small-scaled cell, a cluster ID corresponding to a cluster included in the optional small-scaled cell, and the time index, and a time index determined according to time change based on the specific reference.

A terminal or UE according to a disclosure of the present invention finds an optional small-scaled cell of a wireless communication system including a plurality of small cell clusters having a plurality of small cells. The terminal or UE includes: an RF unit to receive a discovery signal generated by the optional small-scaled cell and a processor to search the optional small-scaled cell based on the discovery signal. The location of the resource element to which the discovery signal is transmitted may be changed according to a time.

The resource element location to which the discovery signal is transmitted is changed according to a time based on a specific reference. In this case, the specific reference may include a sub-frame, a radio frame, and generation of a transmission event with respect to and the discovery signal.

In addition, the location of a resource element to which the discovery signal is transmitted is changed according to a specific hopping pattern. The specific pattern may be determined differently by small cells and by clusters.

The specific hopping pattern may be determined according to a cell ID corresponding to an optional small cell, a cluster ID corresponding to a cluster including an optional small cell, and a time index determined according to time change based on the specific reference.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

As described above, according to the disclosure of the present invention, the problem of the related art is solved. In detail, according to the disclosure of the present invention, a discovery signal is transmitted on a resource element determined by taking into consideration interference between adjacent cells so that efficient and excellent cell discovery procedure or cell discovery procedure are performed.

What is claimed is:

1. A method for performing measurements of discovery signals, the method performed by a wireless terminal and comprising:
    receiving information on discovery signals,
    wherein the information on the discovery signals includes a periodicity, an offset and a cell identifier;
    determining a timing to measure the discovery signals based on the information on the discovery signals,
    wherein in determining the timing, a system frame number (SFN) of a primary cell is used; and
    receiving the discovery signals from a secondary cell of a group of cells during a predetermined duration,
    wherein the predetermined duration is common to the group of cells which transmits the discovery signals on a same frequency, and
    wherein the predetermined duration is a period when other signals or other channels are not transmitted from the secondary cell.

2. The method of claim 1, wherein at least one of the discovery signals include a signal based on at least one of cell-specific reference signal (CRS), a channel-state information reference signal (CSI-RS), a primary synchronization signal (PSS) or a secondary synchronization signal (SSS).

3. The method of claim 1, wherein the information on the discovery signals further includes information on a channel-state information reference signal (CSI-RS).

4. The method of claim 1, wherein the information on the discovery signals is received per a frequency.

5. The method of claim 1, further comprising:
    measuring the discovery signals based on the determined timing.

6. A wireless terminal for performing measurements of discovery signals, the wireless terminal comprising:
    a transceiver; and
    a processor configured to:
        control the transceiver to receive information on discovery signals,
        wherein the information on the discovery signals including a discovery signal periodicity, a discovery signal offset and a discovery signal cell identifier, and
        determine a timing to measure the discovery signals based on the information on the discovery signals,
        wherein in determining the timing, a system frame number (SFN) of a primary cell is used, and
        control the transceiver to receive the discovery signals from a secondary cell of a group of cells during a predetermined duration,
        wherein the predetermined duration is common to the group of cells which transmits the discovery signals on a same frequency, and
        wherein the predetermined duration is a period when other signals or other channels are not transmitted from the secondary cell.

7. The wireless terminal of claim 6, wherein at least one of the discovery signals is a signal based on at least one of cell-specific reference signal (CRS), a channel-state information reference signal (CSI-RS), a primary synchronization signal (PSS) or a secondary synchronization signal (SSS).

8. The wireless terminal of claim 6, wherein the information on the discovery signals further includes information on a channel-state information reference signal (CSI-RS).

9. The wireless terminal of claim 6, wherein the information on the discovery signals is received per a frequency.

10. The wireless terminal of claim 6, wherein the processor is further configured to measure the discovery signals based on the determined timing.

* * * * *